(12) United States Patent
Siebel et al.

(10) Patent No.: US 12,413,608 B2
(45) Date of Patent: Sep. 9, 2025

(54) ENTERPRISE CYBERSECURITY AI PLATFORM

(71) Applicant: C3.ai, Inc., Redwood City, CA (US)

(72) Inventors: Thomas M. Siebel, Woodside, CA (US); Aaron W. Brown, Chicago, IL (US); Varun Badrinath Krishna, Redwood City, CA (US); Nikhil Krishnan, San Carlos, CA (US); Ansh J. Hirani, New York City, NY (US)

(73) Assignee: C3.ai, Inc., Redwood City, CA (US)

( * ) Notice: Subject to any disclaimer, the term of this patent is extended or adjusted under 35 U.S.C. 154(b) by 342 days.

(21) Appl. No.: 17/654,371

(22) Filed: Mar. 10, 2022

(65) Prior Publication Data

US 2023/0291755 A1    Sep. 14, 2023

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01); *H04L 63/1441* (2013.01)

(58) Field of Classification Search
CPC ............ H04L 63/1425; H04L 63/1441; H04L 63/1416; G06N 20/00; G06N 20/20
See application file for complete search history.

(56) References Cited

U.S. PATENT DOCUMENTS

| | | | | |
|---|---|---|---|---|
| 10,904,270 B2 * | 1/2021 | Muddu | ............... | G06F 3/04847 |
| 11,442,963 B1 * | 9/2022 | Lecue | .................. | G06F 16/906 |
| 11,507,779 B1 * | 11/2022 | Amouie | ................ | G06F 18/214 |
| 11,663,067 B2 * | 5/2023 | Anghel | .................. | G06N 3/045 |
| | | | | 706/21 |
| 2005/0044406 A1 * | 2/2005 | Stute | ..................... | C12Q 1/6865 |
| | | | | 713/153 |
| 2017/0251007 A1 * | 8/2017 | Fujisawa | ............. | H04L 63/0272 |
| 2018/0091540 A1 * | 3/2018 | Solow | ................. | H04L 63/1433 |
| 2018/0121549 A1 * | 5/2018 | Ramesh | .............. | G06F 16/9535 |
| 2018/0302423 A1 | 10/2018 | Muddu et al. | | |
| 2020/0167786 A1 * | 5/2020 | Kursun | ................... | H04L 63/08 |
| 2021/0019412 A1 * | 1/2021 | Hewlett, II | ........... | G06F 21/565 |

(Continued)

OTHER PUBLICATIONS

International Search Report and Written Opinion of the International Searching Authority dated Jul. 27, 2023 in connection with International Patent Application No. PCT/US2023/063508, 11 pages.

*Primary Examiner* — Hany S. Gadalla

(57) ABSTRACT

A method includes obtaining data associated with operation of a monitored system. The method also includes using one or more first machine learning models to identify anomalies in the monitored system based on the obtained data, where each anomaly identifies an anomalous behavior. The method further includes using one or more second machine learning models to classify each of at least some of the identified anomalies into one of multiple classifications. Different ones of the classifications are associated with different types of cyberthreats to the monitored system, and the identified anomalies are classified based on risk scores determined using the one or more second machine learning models. In addition, the method includes identifying, for each of at least some of the anomalies, one or more actions to be performed in order to counteract the cyberthreat associated with the anomaly.

36 Claims, 9 Drawing Sheets

(56) References Cited

U.S. PATENT DOCUMENTS

| | | | |
|---|---|---|---|
| 2021/0058395 A1* | 2/2021 | Jakobsson | H04L 67/306 |
| 2021/0281592 A1* | 9/2021 | Givental | G06N 20/10 |
| 2021/0342452 A1 | 11/2021 | Mahaffey et al. | |
| 2022/0030018 A1 | 1/2022 | Jeyakumar et al. | |
| 2022/0053010 A1* | 2/2022 | Elyashiv | G06N 3/088 |
| 2022/0138321 A1* | 5/2022 | Shrestha | G06F 16/285 |
| | | | 713/187 |
| 2022/0187814 A1* | 6/2022 | Murugesan | G05B 23/024 |
| 2022/0224702 A1* | 7/2022 | Dherange | H04L 63/1433 |
| 2022/0245362 A1* | 8/2022 | Nizar | G06F 40/216 |
| 2022/0318684 A1* | 10/2022 | Allahdadian | G06N 3/04 |
| 2023/0032131 A1* | 2/2023 | Harper | A61B 5/0022 |
| 2023/0083118 A1* | 3/2023 | Barbee | G06Q 40/02 |
| | | | 706/47 |
| 2023/0209351 A1* | 6/2023 | Djankovic | H04W 12/48 |
| | | | 455/411 |
| 2023/0229738 A1* | 7/2023 | Cleere | G06N 20/20 |
| | | | 706/12 |

* cited by examiner

ENTERPRISE CYBERSECURITY AI PLATFORM

TECHNICAL FIELD

This disclosure is generally directed to cybersecurity systems. More specifically, this disclosure is directed to an enterprise cybersecurity artificial intelligence (AI) platform.

BACKGROUND

Various businesses, governmental entities, and other enterprises have what are known as Security Operations Centers (SOCs), which are responsible for (i) identifying suspicious cybersecurity-related activities (anomalies) that could be indicators of breaches or other cyberattacks and (ii) taking actions by having security engineers or other personnel rectify specified events. Each SOC is typically built around a core System Integrated Event Monitoring (SIEM) solution, which is responsible for identifying and flagging events that may be indicative of cyberattacks. While a SIEM system can provide great descriptive value in tabular form, it is often challenging and time-intensive for security analysts to stitch together information and pull anything useful out of a modern SIEM system. As a result, SOCs routinely draw upon the knowledge of veteran analysts in order to filter through noise and pull valuable insights out of their SIEM systems. Unfortunately, this leaves enterprises vulnerable since it requires knowledge transfer over time and is not a scalable practice.

SUMMARY

This disclosure relates to an enterprise cybersecurity artificial intelligence (AI) platform.

In a first embodiment, a method includes obtaining data associated with operation of a monitored system. The monitored system includes electronic devices and one or more networks, and the obtained data is associated with events involving the electronic devices and the one or more networks. The method also includes using one or more first machine learning models to identify anomalies in the monitored system based on the obtained data. Each anomaly identifies an anomalous behavior of at least one of the electronic devices or at least one of the one or more networks. The method further includes using one or more second machine learning models to classify each of at least some of the identified anomalies into one of multiple classifications. Different ones of the classifications are associated with different types of cyberthreats to the monitored system. The identified anomalies are classified based on risk scores determined using the one or more second machine learning models. In addition, the method includes identifying, for each of at least some of the anomalies, one or more actions to be performed in order to counteract the cyberthreat associated with the anomaly.

In a second embodiment, an apparatus includes at least one processing device configured to obtain data associated with operation of a monitored system. The monitored system includes electronic devices and one or more networks, and the obtained data is associated with events involving the electronic devices and the one or more networks. The at least one processing device is also configured to use one or more first machine learning models to identify anomalies in the monitored system based on the obtained data. Each anomaly identifies an anomalous behavior of at least one of the electronic devices or at least one of the one or more networks. The at least one processing device is further configured to use one or more second machine learning models to classify each of at least some of the identified anomalies into one of multiple classifications based on risk scores determined using the one or more second machine learning models. Different ones of the classifications are associated with different types of cyberthreats to the monitored system. In addition, the at least one processing device is also configured to identify, for each of at least some of the anomalies, one or more actions to be performed in order to counteract the cyberthreat associated with the anomaly.

In a third embodiment, a non-transitory computer readable medium storing computer readable program code that when executed causes one or more processors to obtain data associated with operation of a monitored system. The monitored system includes electronic devices and one or more networks, and the obtained data is associated with events involving the electronic devices and the one or more networks. The medium also stores computer readable program code that when executed causes the one or more processors to use one or more first machine learning models to identify anomalies in the monitored system based on the obtained data. Each anomaly identifies an anomalous behavior of at least one of the electronic devices or at least one of the one or more networks. The medium further stores computer readable program code that when executed causes the one or more processors to use one or more second machine learning models to classify each of at least some of the identified anomalies into one of multiple classifications based on risk scores determined using the one or more second machine learning models. Different ones of the classifications are associated with different types of cyberthreats to the monitored system. In addition, the medium stores computer readable program code that when executed causes the one or more processors to identify, for each of at least some of the anomalies, one or more actions to be performed in order to counteract the cyberthreat associated with the anomaly.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
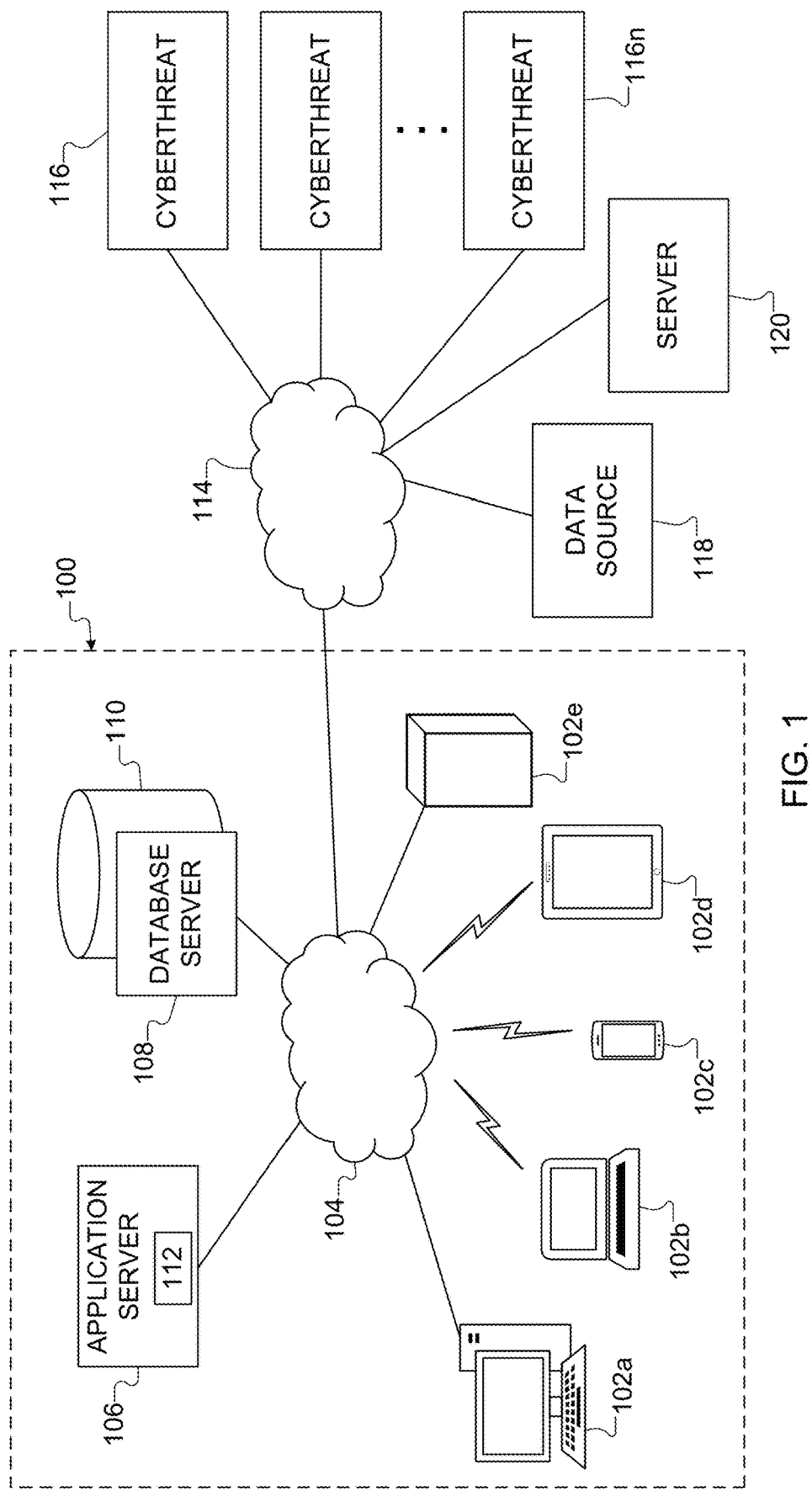
FIG. 1 illustrates an example system supporting an enterprise cybersecurity artificial intelligence (AI) platform according to this disclosure.

FIGS. 1 through 15, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, various businesses, governmental entities, and other enterprises have what are known as Security Operations Centers (SOCs), which are responsible for (i) identifying suspicious cybersecurity-related activities (anomalies) that could be indicators of breaches or other cyberattacks and (ii) taking actions by having security engineers or other personnel rectify specified events. Each SOC is typically built around a core System Integrated Event Monitoring (SIEM) solution, which is responsible for identifying and flagging events that may be indicative of cyberattacks. While a SIEM system can provide great descriptive value in tabular form, it is often challenging and time-intensive for security analysts to stitch together information and pull anything useful out of a modern SIEM system. As a result, SOCs routinely draw upon the knowledge of veteran analysts in order to filter through noise and pull valuable insights out of their SIEM systems. Unfortunately, this leaves enterprises vulnerable since it requires knowledge transfer over time and is not a scalable practice.

Among other things, conventional approaches can leave gaps in enterprises' cybersecurity solutions, which can be exploited by attackers. For example, conventional approaches often use rules-based techniques to identify potential cybersecurity threats or other cyber-related issues. However, rules-based approaches typically have high false positive rates (meaning they incorrectly identify cybersecurity threats), cannot evolve over time, and cannot identify unique normal or anomalous behavioral patterns of individual systems. As another example, conventional approaches often have high storage costs since they can ingest, store, and process extremely large amounts of cyber-related data. This can make it cost-prohibitive to store cyber-related data beyond a limited timeframe (such as a few months), which can hamper traditional security analysts and conventional cyber-related applications. As yet another example, conventional approaches often have poor detection precision since machine learning (ML) or other artificial intelligence (AI)-based applications are not used at scale to identify cyberthreats.

This disclosure provides an enterprise cybersecurity AI platform that can be used for identifying and responding to cyberthreats related to one or more monitored systems. As described in more detail below, the AI platform supports a number of features and functions used to identify and respond to cyberthreats. For example, the AI platform can aggregate historical and near real-time/real-time cyber-related telemetry data or other cyber-related data, which can be used to create a unified image of the cyberthreats faced by an enterprise. The AI platform can also identify anomalous cyber-related activities using an AI-based learned approach, which can provide for effective identification of cyberthreats. The AI platform can further increase an enterprise's security data history by preprocessing telemetry data or other cyber-related data and persisting only selected information (such as event profiles, vectors, and datasets) for a prolonged period of time, which may enable longer-term storage of more relevant cyber-related information. Moreover, the AI platform can generate alerts built around finding patterns mapped to industry-standard or other attack classes, which can enable simpler identification of the types of cyberthreats detected in a monitored system. In addition, the AI platform can support various workflows for triaging or responding to alerts. Specific features and functions that can be performed to support these operations are described below and include things such as dynamic event log processing and aggregation, multi-AI cybersecurity approaches, system-level detections of security events, multiple data source-based detections, interpretable AI-based cybersecurity features, intelligent automated responses, graph-based anomaly detection/response/visualization, reduced storage footprints, and workflow management. In some embodiments, the enterprise cybersecurity AI platform can be provided using a software as a service (SaaS) approach, although other embodiments of the AI platform may be used.

Embodiments of the enterprise cybersecurity AI platform provided in this disclosure can provide various advantages or benefits depending on the implementation. For example, the AI platform can be used to more effectively identify and respond to cyberthreats, such as by reducing false positive rates, evolving over time to identify new cyberthreats, and identifying unique normal or anomalous behavioral patterns of individual systems. Also, the AI platform can be scaled as needed or desired to provide protection across a wide range of enterprise systems. Further, the AI platform can provide reduced storage costs since it is possible to store only a selected subset of information related to various cyberthreats or other generated information, such as by persisting aggregated and normalized features of detected cyberthreats. In addition, the AI platform can store information related to cyberthreats over a significantly longer period of time (possibly up to one or multiple years). This can help to enable improved forensic investigations because more data may be available for use in determining what previously occurred within an enterprise's systems. This can also help to provide improved cyberthreat detection accuracy since more data can be obtained and used for training one or more machine learning models within the AI platform.

FIG. 1 illustrates an example system 100 supporting an enterprise cybersecurity AI platform according to this disclosure. For example, the system 100 shown here can be used to identify and respond to cyberthreats using various features and functions described in more detail below. As shown in FIG. 1, the system 100 includes user devices 102a-102e, one or more networks 104, one or more application servers 106, and one or more database servers 108 associated with one or more databases 110. Each user device 102a-102e communicates over the network 104, such as via a wired or wireless connection. Each user device 102a-102e represents any suitable device or system used by at least one user to provide or receive information, such as a desktop computer, a laptop computer, a smartphone, a tablet computer, and a server computer. The server computer may be used to provide any suitable functionality, such as industrial process control, email, or document management. However, any other or additional types of user devices may be used in the system 100.

The network 104 facilitates communication between various components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. In some cases, the network 104 may represent at least one internal or private network used by a business, governmental entity, or other enterprise.

The application server 106 is coupled to the network 104 and is coupled to or otherwise communicates with the database server 108. The application server 106 supports one or more AI-based cybersecurity functions, such as one or more of the AI-based functions described below. For example, the application server 106 may execute one or more applications 112 that implement an AI-based platform for identifying and responding to cyberthreats. At least some of the cyber-related operations of the application server 106 can be based on historical and near real-time/real-time data, and at least some of this data may be obtained from the database 110. Note that the database server 108 may also be used within the application server 106 to store information, in which case the application server 106 may itself store the information used to perform one or more AI-based cybersecurity functions. Also note that the functionality of the application server 106 may be physically distributed across multiple servers or other devices for various reasons, such as redundancy and parallel processing.

The database server 108 operates to store and facilitate retrieval of various information used, generated, or collected by the application server 106 and the user devices 102a-102e in the database 110. For example, the database server 108 may store various information related to prior cybersecurity threats detected by the application server 106 and current operational data related to the system 100 to be used for cybersecurity analysis. Note that the functionality of the database server 108 and database 110 may be physically distributed across multiple database servers and multiple databases for various reasons, such as redundancy and parallel processing.

As described in more detail below, the AI platform provided by the application server 106 or other device(s) may be used to identify and respond to cyberthreats associated with the system 100. For instance, the system 100 is typically connected (directly or indirectly) to one or more external networks 114, such as the Internet. As a result, various cyberthreats 116a-116n exist that can threaten the system 100. For example, the cyberthreats 116a-116n may include viruses, trojan horses, or other malware that attackers wish to install on the user devices 102a-102e, components of the network 104, the application server 106, the database server 108, the database 110, and other components or systems within the system 100. As another example, the cyberthreats 116a-116n may include attackers who attempt to gain access to protected data or protected systems within the system 100, such as through exploitations of weak/default passwords, phishing/spear phishing attempts, exploitations of unpatched/unreported software vulnerabilities, or other attempts.

The AI platform provided by the application server 106 or other device(s) can be used to collect and process information related to a monitored system 100, identify possible indicators of cyberthreats in the form of anomalies (anomalous behaviors or other events), store information about the anomalies, and take actions in response to the anomalies. The application server 106 may perform any number of AI-based cybersecurity functions as part of the AI platform, and various examples of these functions are described below. In some cases, data used for AI-based cybersecurity functions may be obtained from one or more data sources within the system 100 (such as the components shown in FIG. 1) and/or from one or more data sources 118 outside the system 100. Note that while specific examples of AI-based cybersecurity functions are provided below, the AI platform may support one, some, or all of the described functions. If some (but not all) of these functions are supported by the application server 106, the application server 106 may support any desired combination of these functions.

Note that in the system 100 of FIG. 1, the AI platform is assumed to be provided within the system 100 itself using the application server 106. However, the AI platform may be implemented in any other suitable manner. For example, the AI platform may be implemented in a remote server 120, a cloud-based environment, or any other suitable location(s) outside or remote to the system 100. When implemented in this manner, the AI platform may be used to monitor multiple systems 100, such as different systems 100 associated with different enterprises. Also note that the AI platform is often described as being configured to perform various functions, such as monitoring and collection of information and analysis of that information. However, the AI platform may be implemented in a distributed manner that allows different functions to be performed using different devices (possibly at different locations). Thus, for instance, the application server 106, a server 120, or other component may be used to collect information that is provided to a server 120 or other component for analysis. In general, this disclosure is not limited to any particular centralized or distributed implementation of a platform.

Although FIG. 1 illustrates one example of a system 100 supporting an enterprise cybersecurity AI platform, various changes may be made to FIG. 1. For example, the system 100 may include any number of user devices 102a-102e, networks 104, 114, application servers 106, database servers 108, and databases 110. Also, these components may be located in any suitable locations and might be distributed over a large area. Further, while the application server 106 is described above as executing one or more applications 112 to provide an AI platform and perform one or more cybersecurity-related functions for a specific enterprise, the application(s) 112 may be executed by a remote cloud computing system, server(s), or other device(s) and may be used to identify and respond to cyberthreats for a single enterprise or multiple enterprises. In addition, while FIG. 1 illustrates one example operational environment in which an AI platform performing cybersecurity-related functions may be used, this functionality may be used in any other suitable system. As a particular example, FIG. 1 here illustrates an example in which the enterprise cybersecurity AI platform may be used with an enterprise information technology (IT) system, but the enterprise cybersecurity AI platform may be used with other types of systems. For instance, the enterprise cybersecurity AI platform may be used in an operational technology network, such as one that includes programmable logic controllers (PLCs), remote terminal units (RTUs), and controllers (like supervisory control and data acquisition or "SCADA" controllers) of cyber-physical systems.

Figure 2:
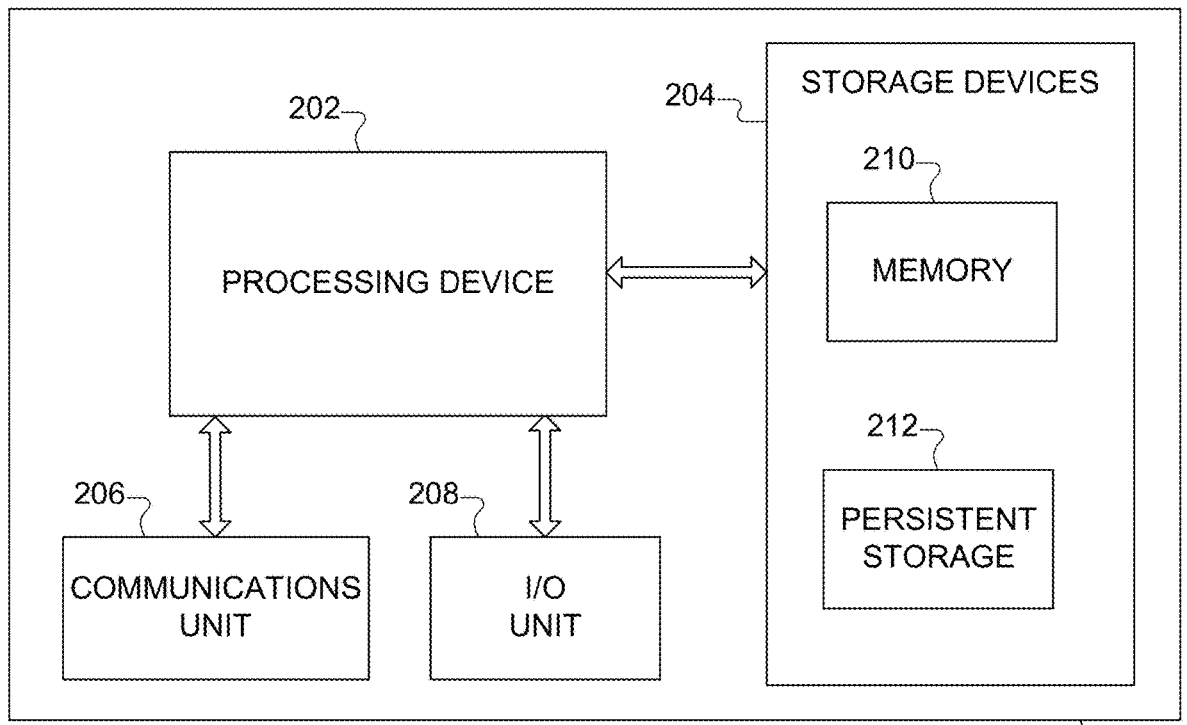
FIG. 2 illustrates an example device supporting an enterprise cybersecurity AI platform according to this disclosure.

FIG. 2 illustrates an example device 200 supporting an enterprise cybersecurity AI platform according to this disclosure. One or more instances of the device 200 may, for example, be used to at least partially implement the functionality of the application server 106 of FIG. 1 or other device(s) used to provide or support an AI-based cybersecurity platform. However, the functionality of the application server 106 may be implemented in any other suitable manner, and the AI platform may be implemented using any suitable device(s) and in any suitable system(s) (such as the server 120).

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network, such as the network 104 or 114. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 represents a server or other device that can be accessed remotely.

Although FIG. 2 illustrates one example of a device 200 supporting an enterprise cybersecurity AI platform, various changes may be made to FIG. 2. For example, computing and communication devices and systems come in a wide variety of configurations, and FIG. 2 does not limit this disclosure to any particular computing or communication device or system.

Figure 3:
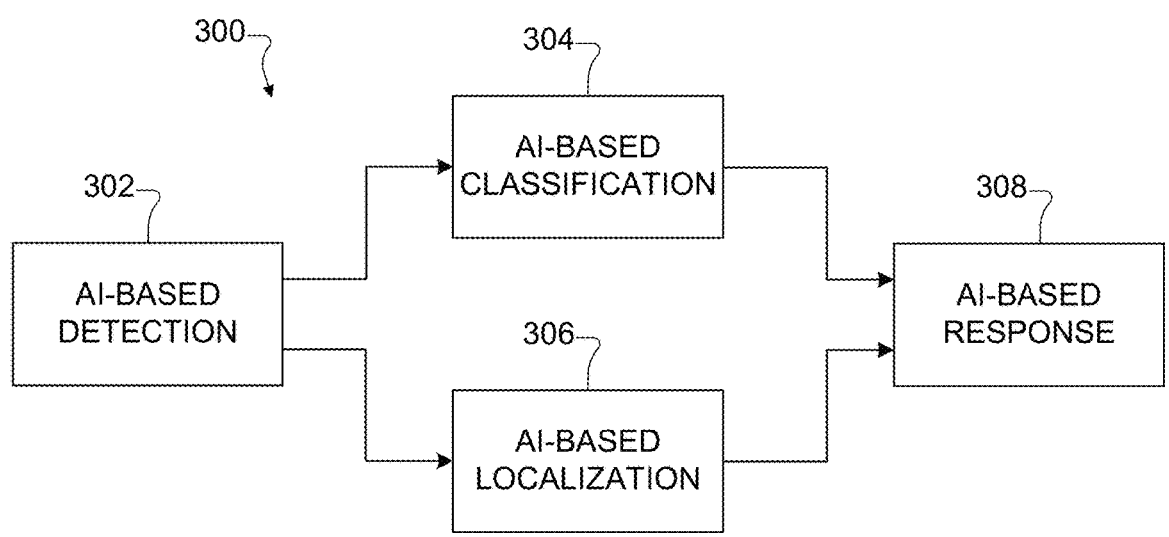
FIG. 3 illustrates an example high-level architecture of an enterprise cybersecurity AI platform according to this disclosure.

FIG. 3 illustrates an example high-level architecture 300 of an enterprise cybersecurity AI platform according to this disclosure. For ease of explanation, the enterprise cybersecurity AI platform represented in FIG. 3 is described as being implemented on or supported by the application server 106 in the system 100 shown in FIG. 1, where the application server 106 may be implemented using one or more instances of the device 200 shown in FIG. 2. However, the enterprise cybersecurity AI platform could be used with any other suitable device(s) and in any other suitable system(s) (such as the server 120).

As shown in FIG. 3, the functionality of the enterprise cybersecurity AI platform is generally divided into four primary functions. An AI-based detection function 302 generally operates to identify possible cybersecurity threats to the system 100 by collecting and analyzing information associated with the system 100 in order to identify anomalies associated with the system 100. For example, the AI-based detection function 302 can be used to identify anomalies that are indicative of specific types of cybersecurity threats to the system 100. Part of this process can involve determining whether devices within the system 100 (such as the user devices 102a-102e, components of the network 104, the application server 106, the database server 108, and the database 110) are engaging in behaviors that are considered anomalous or that depart from expected or anticipated behaviors of those devices. Example operations that can be performed by the AI-based detection function 302 to support anomaly detection are provided below.

An AI-based classification function 304 generally operates to process information associated with anomalies identified by the AI-based detection function 302 and determine what specific types of cyberthreats are represented by the identified anomalies. Cyberthreats can often be classified into broad categories of threats, and the AI-based classification function 304 can be configured to process the information associated with the identified anomalies in order to identify a category for each anomaly or collection of anomalies. Any suitable standard or custom collection of categories may be supported by the AI-based classification function 304. As a particular example, the AI-based classification function 304 can be used to classify anomalies into different categories as defined by the MITRE ATT&CK framework, although other classification schemes may be used. Example operations that can be performed by the AI-based classification function 304 to support anomaly classification are provided below.

An AI-based localization function 306 generally operates to process information associated with anomalies identified by the AI-based detection function 302 (and optionally classifications of the anomalies identified by the AI-based classification function 304) in order to identify where anomalies have occurred with the system 100. For example, the AI-based localization function 306 can process information in order to identify which devices within the system 100 are victims of cyberattacks and where attackers or other incidents (such as malfunctioning equipment) may be located, which may be inside or outside the system 100. Example operations that can be performed by the AI-based localization function 306 to support anomaly localization are provided below.

An AI-based response function 308 generally operates to process information associated with detected anomalies, such as their classifications as identified by the AI-based classification function 304 and their locations as identified by the AI-based localization function 306, in order to identify one or more appropriate responses (if any) to each detected anomaly. For example, the AI-based response function 308 may initiate actions (with or without human intervention or approval) to isolate one or more affected devices within the system 100, block network traffic to or from one or more affected devices within the system 100, or perform other actions intended to mitigate or block identified cyberthreats. Example operations that can be performed by the AI-based response function 308 to support anomaly response are provided below.

Overall, the AI platform can help to identify whether security anomalies that have occurred are worth investigating, determine the types of attacks that the detected anomalies most likely represent, and determine where attackers/incidents and victims of cyberattacks are located within an enterprise's system. Note that the functions shown in or described with respect to FIG. 3 can be implemented in at least one electronic device, such as one or more computing devices, in any suitable manner. For example, in some embodiments, at least some of the functions shown in or described with respect to FIG. 3 can be implemented or supported using one or more software applications or other software instructions that are executed by one or more processing devices of an application server 106, device 200, or other device(s). In other embodiments, at least some of the functions shown in or described with respect to FIG. 3 can be implemented or supported using dedicated hardware components. In general, the functions shown in or described with respect to FIG. 3 can be performed using any suitable hardware or any suitable combination of hardware and software/firmware instructions.

Moreover, the functions 302-308 shown in FIG. 3 here may be implemented using one or more machine learning models. Depending on the implementation, each function 302-308 may be implemented using its own machine learning model(s), or a combination of the functions 302-308 (and possibly all of the functions 302-308) may be implemented using a common machine learning model. Any suitable machine learning model or models may be used to implement the functions 302-308 shown in FIG. 3. Example types of machine learning models that may be used can include deep neural networks (DNNs), convolution neural networks (CNNs), or other suitable machine learning model structures. Also, any suitable technique(s) may be used to train the machine learning model or models to perform the functions 302-308, such as by using back-propagation or other techniques to adjust weights or other parameters of one or more machine learning models based on annotated (labeled) training data.

Although FIG. 3 illustrates one example of a high-level architecture 300 of an enterprise cybersecurity AI platform, various changes may be made to FIG. 3. For example, functions and components can be added, omitted, combined, further subdivided, replicated, or placed in any other suitable configuration in the AI platform according to particular needs. As a particular example, while the functions 302-308 are shown as being separate functions in FIG. 3, at least some of the functions 302-308 may be implemented in an overlapping manner, such as when certain sub-functions are used to implement or support multiple functions 302-308.

Figure 4:
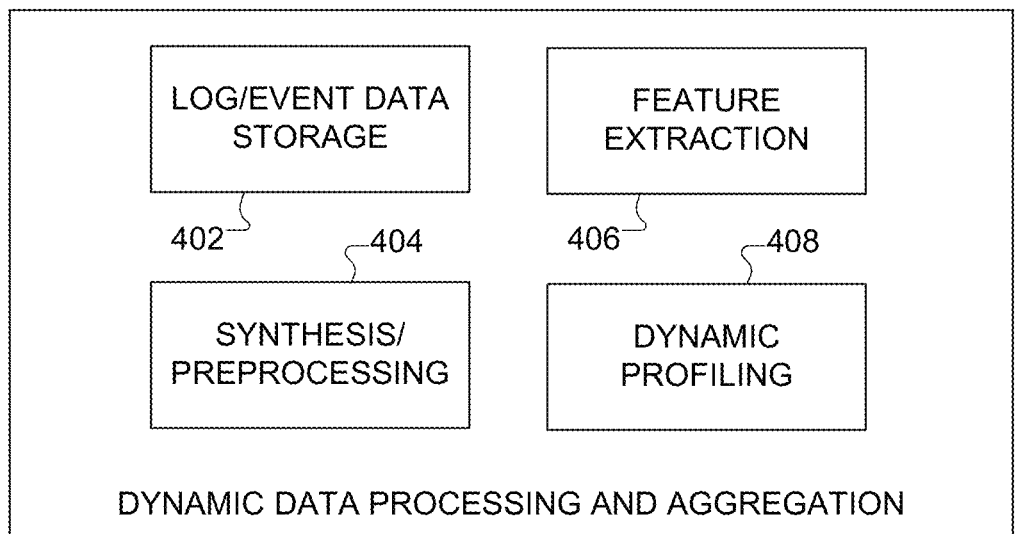
FIG. 4 illustrates an example dynamic data processing and aggregation operation used to collect and preprocess cyber-related information in an enterprise cybersecurity AI platform according to this disclosure.

During operation, the AI platform can collect and analyze a large amount of data related to the system 100 or other monitored system(s). FIG. 4 illustrates an example dynamic data processing and aggregation operation 400 used to collect and preprocess cyber-related information in an enterprise cybersecurity AI platform according to this disclosure. The dynamic data processing and aggregation operation 400 may, for instance, be used within or in conjunction with the AI-based detection function 302 of FIG. 3. As shown in FIG. 4, the dynamic data processing and aggregation operation 400 includes a log or other event data storage operation 402, a synthesis/preprocessing operation 404, a feature extraction operation 406, and a dynamic profiling operation 408. These operations 402-408 are used to take large amounts of cyber-related telemetry data or other information, synthesize the information, and extract features from the information for subsequent processing.

The data storage operation 402 generally operates to collect and store cyber-related data that is generated within or collected about the system 100. For example, the data storage operation 402 may collect and store logs (such as system logs and event logs) that are generated by various devices within the system 100 and provided to the AI platform. The data storage operation 402 may also collect and store NetFlow data or other captured network traffic that is flowing through the network(s) 104 within the system 100 and provided to the AI platform. The data storage operation 402 may further collect and store data derived via observation of the system 100 or knowledge of the system's design, such as behavioral patterns of users within the system 100 or shared insights derived from knowledge of the devices within the system 100 and other monitored systems. In addition, the data storage operation 402 may collect and store cyber-related data or other data generated outside the system 100 and provided to the AI platform, such as information identifying discovered vulnerabilities or threat intelligence feeds.

In general, the data storage operation 402 may be used to collect and store any suitable cyber-related information, and the data storage operation 402 can support the use of multiple data sources for obtaining this information. The information that is obtained here can relate to any events that occur within a monitored system or that affect a monitored system. Event-related information can be obtained from any suitable source(s) and in any suitable format(s). Note that an enterprise may typically generate system and event logs at high frequencies and otherwise generate large amounts of cyber-related information. In conventional systems, it is often a struggle to parse this information in order to identify anomalies indicative of possible cyber-incidents versus genuine or acceptable behaviors identified within the cyber-related information. The data storage operation 402 here can be used to collect and store cyber-related information for additional processing in order to facilitate easier and more effective identification of anomalous behaviors that can be indicative of cyberthreats.

The synthesis/preprocessing operation 404 generally operates to preprocess the information collected and stored by the data storage operation 402 in order to identify data that can be used during subsequent processing. For example, the synthesis/preprocessing operation 404 may parse system and event logs to extract semantic meanings, and the synthesis/preprocessing operation 404 may parse NetFlow data or other captured network traffic to extract network activity behaviors. As particular examples, the synthesis/preprocessing operation 404 may perform system and event log parsing using natural language processing (NLP), which may be implemented using suitable techniques like tokenization, N-grams, bag-of-words, or term frequency-inverse document frequency (tf-idf) processing. Also, as particular examples, the synthesis/preprocessing operation 404 may process NetFlow data or other captured network traffic using aggregations across interactions (such as by using inbound and outbound counts) and graphical representations to identify how subgroups of devices interact with one another or otherwise behave within the system 100. In general, the processing of the information here can be used to help isolate information regarding events that occur in or that affect a monitored system. Note that while the synthesis/preprocessing operation 404 here can preprocess the information collected and stored by the data storage operation 402, that information may be retained in its raw form (at least temporarily) in case an anomaly is detected that requires the ability to view the original raw data, such as for forensic analysis. Thus, event-related data can include both raw data and derived data, meaning data determined, calculated, or otherwise generated using or based on the raw data.

The feature extraction operation 406 generally operates to process information (such as the information collected by the data storage operation 402 and preprocessed by the synthesis/preprocessing operation 404) in order to extract features of the information, where the features are used subsequently as inputs to one or more machine learning models for use in identifying anomalies. Note that any suitable features associated with the information can be identified by the feature extraction operation 406 for use in identifying anomalous behaviors within the system 100. As particular examples, the identified features may include a network's average number of users, an average number of user inbound connections, an average number of user outbound connections, and critical words that may be used in risky system and event logs.

The dynamic profiling operation 408 generally operates to combine various data, such as information as preprocessed by the synthesis/preprocessing operation 404 and features as identified by the feature extraction operation 406, into various profiles. Each profile may contain a collection of information associated with at least one anomaly that may be indicative of a cyberthreat. These profiles can be provided to other functions or operations for analysis. Note that the creation of the profiles by the dynamic profiling operation 408 is dynamic and varies based on the information being collected and analyzed. Among other things, this may allow the AI platform to learn what are and are not typical behaviors within the monitored system 100.

In some embodiments, the dynamic data processing and aggregation operation 400 shown in FIG. 4 supports a multi-data source approach for anomaly detection, such as by enabling the collection of a wide variety of information from a number of data sources. The multiple data sources and their associated data signals can be used by various anomaly detection algorithms (examples of which are described in more detail below) to identify cyber-related anomalies. In particular embodiments, tasks for identifying different types of anomalies are identified in Table 1 below, along with the type(s) of data that might be collected or the type(s) of data source(s) that might be accessed for use in identifying those different types of anomalies.

TABLE 1

| Detection Task | Approach |
|---|---|
| Networked Assets | Firmware versions and upgrades |
| | Connected assets without asset managers |
| Insider threat detection | Personnel digital activities |
| | Personnel physical movements and building accesses |
| | Access requests by personnel |
| | Trust boundary violations by personnel |
| Data exfiltration and backdoor detection | Outbound connection Internet Protocol (IP) checks against suspicious locations and addresses |
| | Number of unique IP addresses |
| | Appearance of new IP pairs |
| Denial of Service (DoS) and Distributed DoS (DDoS) detection | Network volume analytics |
| | Inbound network activity from unique sources |
| | Bandwidth/CPU usage spikes |
| Lateral movement detection | Activities among networked assets |
| | Inferred directions of spreads of activity |
| Advanced persistent threat detection | Related events clustered and tracked over time |
| | Cumulative risk scores for clusters updated with each new event added |
| Threat summary generation | NLP-driven extraction of relevant logs pertaining to threats |
| | AI-powered natural language generation, such by using N-grams or other techniques |
| Recommendation generation | Security expert-driven recommendations defined for known threats |
| Vulnerability libraries | External and internal vulnerability libraries, updated as new threats emerge |
| | Ransomware signature identification |
| | Closed-loop activities on actioned alerts and recommended actions |
| Risk-based asset/ event prioritization | Overall risk scores for system-level events that are generated |
| | Comprehensive severity scores based on customer and downstream impact analyses |

Specific examples of shared insights that might be collected and used for anomaly detection could include the following. Modeling insights (meaning insights gained for machine learning models used for anomaly detection) can be shared across multiple deployments of the AI platform, even for different enterprises, to support functions such as label bootstrapping. For instance, models deployed for use in different installations may be grouped (such as by industry or type of cyber-topology used), and models that are trained in deployments from each group can be used for training additional models in other deployments that are within the same group and that lack labels. The selected grouping approach may be based on various factors, such as prior experience deploying models in the field. Note that the sharing of insights may not involve the sharing of actual data between deployments, since much or all of the data associated with each enterprise is likely considered proprietary. However, derived data from model parameters, hyper-parameters, and feature contributions can be shared between deployments without compromising confidentiality. This may allow, for instance, threats seen at one or some deployments to be used in other deployments that have not yet seen the threats. In some embodiments, a centralized data storage (such as a database or other data source 118) may be used to store shared insights and keep track of information, such as feature importances for determining different types of cyber-attacks. In particular embodiments, when sufficient data is available, a deep neural network or other machine learning model can be trained and stored along with its weights so that it can potentially be used in multiple deployments. Depending on the implementation, such a pretrained machine learning model may be used directly in a new deployment or after the use of transfer learning in which the weights of most layers in the model are frozen and one or a few layers are trained using deployment-specific data so that both general and specific attack signatures can be detected.

One possible benefit of using the dynamic data processing and aggregation operation 400 can be support for reduced storage footprints. This is because it is possible to normalize and aggregate high-frequency system and event logs and other cyber-related information and then store derived data that is considered relevant to downstream operations of the AI platform and for possible forensic or retrospective cyber-investigations. The relevance of the derived data can be determined in any suitable manner, such as by humans with domain expertise or by AI models (like when an AI model identifies derived data that is converted into AI input features whose contributions are high to decisions made by the AI model). Raw event data may only need to be stored when actual anomalies are detected, and other raw event data can be discarded. Also, the raw event data for actual anomalies may only need to be stored for a limited amount of time (such as one or several months), while the derived data can be stored for much longer periods of time since it is smaller in size.

Although FIG. 4 illustrates one example of a dynamic data processing and aggregation operation 400 used to collect and preprocess cyber-related information in an enterprise cybersecurity AI platform, various changes may be made to FIG. 4. For example, functions and components can be added, omitted, combined, further subdivided, replicated, or placed in any other suitable configuration in FIG. 4 according to particular needs. Also, any other suitable techniques may be used for collecting and preprocessing cyber-related information.

Figure 5:
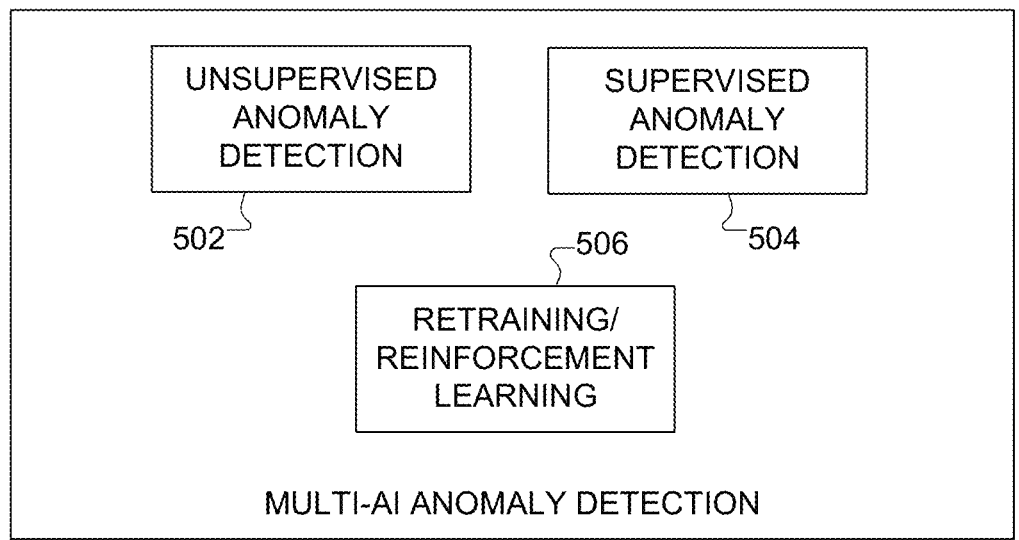
FIG. 5 illustrates an example multi-AI anomaly detection operation used to process cyber-related information in an enterprise cybersecurity AI platform according to this disclosure.

FIG. 5 illustrates an example multi-AI anomaly detection operation 500 used to process cyber-related information in an enterprise cybersecurity AI platform according to this disclosure. The multi-AI anomaly detection operation 500 may, for instance, be used within or in conjunction with the AI-based detection function 302 of FIG. 3. The anomaly detection operation 500 is generally configured to use multiple AI-based approaches for processing cyber-related information (such as the profiles or other outputs generated by the dynamic data processing and aggregation operation 400) in order to detect anomalies within the system 100 or other monitored system(s) that may be indicative of cyber-threats. As shown in FIG. 5, the anomaly detection operation 500 includes an unsupervised anomaly detection operation 502, a supervised anomaly detection operation 504, and a retraining or reinforcement learning operation 506.

The unsupervised anomaly detection operation 502 generally operates to process cyber-related information in order to identify anomalies based on the information. The unsupervised anomaly detection operation 502 here uses unsupervised learning to process the information, where the unsupervised learning typically includes using one or more machine learning models to analyze and cluster unlabeled data in order to identify possible associations within the data. The cyber-related information being processed here is considered "unlabeled" since the cyber-related information lacks contain labels identifying where anomalies actually exist. The unsupervised anomaly detection operation 502 may use any suitable technique(s) to perform unsupervised detection of anomalies. Example techniques that may be used by the unsupervised anomaly detection operation 502 could include isolation forests, auto-encoders, one-class support vector machines (SVMs), and Gaussian mixture models.

The supervised anomaly detection operation 504 also generally operates to process cyber-related information in order to identify anomalies based on the information. However, the supervised anomaly detection operation 504 here uses supervised learning to process the information, where the supervised learning typically includes using one or more machine learning models that have been trained to process data in order to identify labels for specific types of anomalies that are detected. The one or more machine learning models here are essentially trained to identify which labels identifying different types of anomalies should be applied to the cyber-related information being processed. Depending on the implementation, the labels that are used by the supervised anomaly detection operation 504 can be generated or otherwise obtained in any suitable manner. For instance, the labels that are used by the supervised anomaly detection operation 504 may be provided by the enterprise running the AI platform, generated using results from the unsupervised anomaly detection operation 502 (which may be referred to as bootstrapping), generated using internal "red-teaming" efforts where trusted parties attack the system 100 and record the time and nature of their attacks, or obtained from users of the AI platform (such as through feedback from security analysts who analyze detected anomalies). The supervised anomaly detection operation 504 may use any suitable technique to perform supervised detection of anomalies. Example techniques that may be used by the supervised anomaly detection operation 504 could include random forest classifiers, gradient boosting classifiers, and neural networks.

The retraining or reinforcement learning operation 506 may be used to retrain or otherwise adjust the operation of the unsupervised anomaly detection operation 502 and the supervised anomaly detection operation 504. For example, the retraining or reinforcement learning operation 506 may be used to retrain or otherwise adjust the one or more machine learning models used by the unsupervised anomaly detection operation 502 and to retrain or otherwise adjust the one or more machine learning models used by the supervised anomaly detection operation 504. This can be done, for instance, using additional training data that is obtained by the retraining or reinforcement learning operation 506. The additional training data may typically represent annotated data, which means that the additional training data includes labels identifying known ground truths (known anomalies) associated with the additional training data. The additional training data may be obtained from any suitable source(s). In some cases, the additional training data can be based on actual instances of cyberattacks against the system 100, where various components of the AI platform capture information associated with the actual cyberattacks. The additional training data may also take the form of feedback from one or more security analysts or other users who accept and reject alerts for detected anomalies, where the feedback can be used during retraining or reinforcement learning. For instance, the feedback may indicate that identified cyberthreats are actually false positives (no cyberthreats actually existed), which can help to capture knowledge of the security analysts or other personnel for subsequent use. This can help to support continuous improvement of the machine learning models' performances over time.

Although FIG. 5 illustrates one example of a multi-AI anomaly detection operation 500 used to process cyber-related information in an enterprise cybersecurity AI platform, various changes may be made to FIG. 5. For example, functions and components can be added, omitted, combined, further subdivided, replicated, or placed in any other suitable configuration in FIG. 5 according to particular needs. Also, any other suitable techniques may be used for processing cyber-related information and identifying anomalies.

As noted above, the AI-based classification function 304 generally operates to determine what specific types of cyberthreats are represented by identified anomalies. Any suitable classification scheme can be used by the AI-based classification function 304 here, such as a standard or custom classification scheme. As a particular example, anomalies can be classified by the AI-based classification function 304 into different categories as defined by the MITRE ATT&CK framework, which can encompass the following example types of categories.

A reconnaissance category refers to anomalies related to adversaries gathering information to plan future operations, such as information about a target enterprise, information gained through active scanning, and information gained through phishing attempts. A resource development category refers to anomalies related to adversaries establishing resources to support future targeting operations, such as setting up command and control infrastructure and compromising or establishing accounts. An initial access category refers to anomalies related to adversaries trying to gain a foothold within a protected system, such as through spear phishing attempts, exploitation of impossible travel, and exploitation of weak passwords.

An execution category refers to anomalies related to adversaries trying to run malicious code on a protected system, such as by compromising built-in scripting environments and interpreters to run custom code for network exploration, stealing data and credentials, and running remote access tools (like shells). A persistence category refers to anomalies related to adversaries trying to maintain their foothold within a protected system, such as when an adversary (once a code script is executed) tries to prevent defensive actions within the protected system that would interrupt the attack lifecycle. Various types of actions that adversaries may try to prevent could include system restarts, credential changes, and configuration resets, such as changing configurations, manipulating accounts, modifying SSH keys, and modifying registry entries. A privilege escalation category refers to anomalies related to adversaries trying to gain higher-level permissions, such as elevated permissions, in a protected system, such as root and admin access privileges (which may be obtained by leveraging a vulnerability to elevate access, bypassing user access controls, or role-based access abuse).

A defense evasion category refers to anomalies related to adversaries trying to avoid being detected by disabling or uninstalling security systems and scripts, such as by masquerading malicious activities under known and trusted processes that go under the radar or subverting potential defenses (like using trusted processes to hide malware, token impersonation, or elevated execution). A credential access category refers to anomalies related to adversaries stealing account names and passwords, such as via keylogging and password cracking. A discovery category refers to anomalies related to adversaries trying to figure out a protected system's environment, such as when adversaries discover a wider network and understand which entry points and corresponding network environments are most suitable for their objectives post-compromise (like exploring what they can control, performing account discovery, performing network sniffing, and engaging in policy and permission group discovery).

A lateral movement category refers to anomalies related to adversaries moving through an environment, such as when adversaries move laterally across network environments and pivot between systems and accounts for stealthier operations (which can involve compromising more legitimate credentials as well as network and default operating system tools, like using legitimate credentials to pivot through multiple systems, perform SSH hijacking, or engage in internal spear phishing). A collection category refers to anomalies related to adversaries gathering data of interest to the adversaries' goals, such as accessing cloud storages, capturing keyboard inputs, and accessing databases and archives. A command and control category refers to anomalies related to adversaries communicating with compromised systems to control them, such as when attackers take control of a protected system and related systems with various stealth levels. The captured systems can act upon commands from the adversaries and mimic normal network behaviors to avoid possible detection, such as by mimicking normal web traffic to communicate with a victim network and performing data encoding. An exfiltration category refers to anomalies related to adversaries stealing data, such as by transferring data to cloud accounts and performing automated exfiltration. An impact category refers to anomalies related to adversaries manipulating, interrupting, or destroying systems and data, such as by performing account access removal, data destruction, disk wipes, resource hijacking, and data encryption with ransomware.

In the following discussion, it is assumed that the AI-based classification function 304 is configured to classify anomalies into the categories defined by the MITRE ATT&CK framework described above. However, any other suitable classification schemes may be used by the AI-based classification function 304. In those cases, the operations of the AI-based classification function 304 can be easily changed, such as through appropriate machine learning model training, to use the other classification schemes.

Figure 6:
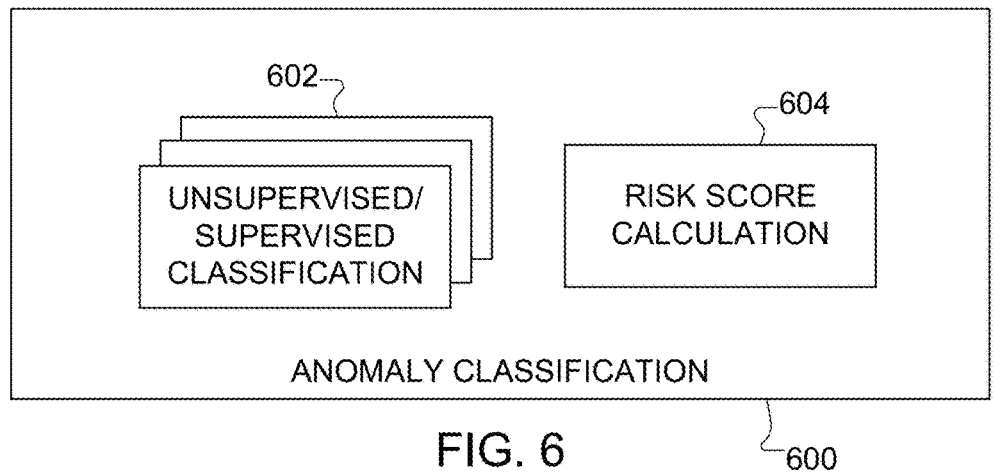
FIG. 6 illustrates an example classification operation used to classify detected anomalies in an enterprise cybersecurity AI platform according to this disclosure.

FIG. 6 illustrates an example classification operation 600 used to classify detected anomalies in an enterprise cybersecurity AI platform according to this disclosure. The classification operation 600 may, for instance, be used within or in conjunction with the AI-based classification function 304 of FIG. 3. The classification operation 600 is generally configured to classify detected anomalies that may be indicative of cyberthreats into different categories or classifications. As shown in FIG. 6, the classification operation 600 includes one or more unsupervised and/or supervised classifier operations 602 and a risk score calculation operation 604.

Each classifier operation 602 generally operates to process profiles or other information associated with identified anomalies in order to classify the anomalies, which may be done using any suitable supervised or unsupervised learning technique(s). The unsupervised and supervised classifier operations 602 differ in that the unsupervised classifier operations 602 use unsupervised learning and the supervised classifier operations 602 use supervised learning. Thus, each of the unsupervised classifier operations 602 may be used to analyze and cluster profiles or other information in order to identify possible associations within the information, while each of the supervised classifier operations 602 may be used to analyze profiles or other information and identify classification labels, such as known attack classes, for the information.

Each classifier operation 602 can be implemented using one or more trained machine learning models, such as one or more DNNs or CNNs. Depending on the implementation, each trained machine learning model may be used to classify anomalies into one or more specific types or classifications of anomalies. In some embodiments, for example, there may be one trained machine learning model (one classifier operation 602) for each anomaly classification, such as one for each classification within the MITRE ATT&CK framework described above. In particular embodiments, each classifier operation 602 could be trained to recognize a single classification of anomalies, and each classifier operation 602 could output a true or false indicator identifying whether processed information can or cannot be classified into that classifier's associated classification. In other embodiments, a trained machine learning model may be used in a classifier operation 602 to classify information into multiple classifications. In general, the classification operation 600 may use any suitable classification technique or techniques to classify anomalies.

When multiple classifier operations 602 are used in the classification operation 600, the risk score calculation operation 604 can be used to fuse, combine, or otherwise process the outputs from those classifier operations 602. The risk score calculation operation 604 can also generate final risk scores, such as by generating multiple risk scores for each anomaly (where each risk score identifies a probability or other likelihood that the anomaly can be classified into one of the classifications). The risk score calculation operation 604 may use any suitable technique to determine final classifications of anomalies based on outputs from multiple classification functions. For instance, the risk score calculation operation 604 may process numerical scores from multiple classifier operations 602, where each numerical score identifies a likelihood that an anomaly should be classified into the classifications associated with that classifier operations 602. For each anomaly, the risk score calculation operation 604 can process those numerical scores and generate final risk scores for the various classifications, and the final risk scores can be used to identify the most likely classification for that anomaly. In other embodiments, the risk score calculation operation 604 may process outputs generated by multiple anomaly detection models directly (such as models in the AI-based classification function 304) rather than processing outputs generated by multiple anomaly classification models.

Figure 7:
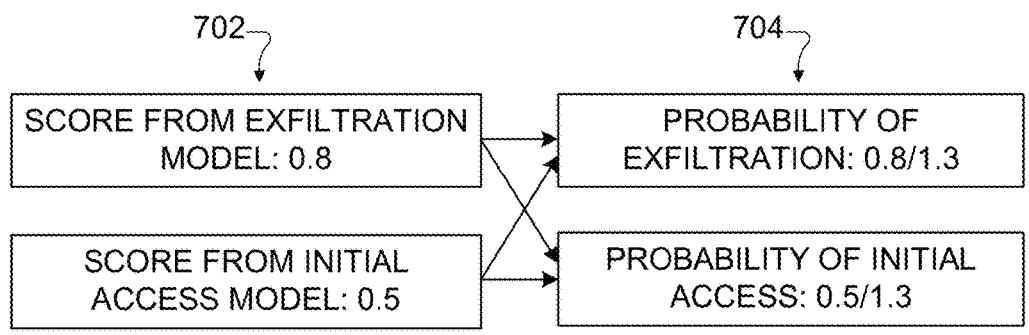
FIGS. 7 and 8 illustrate example techniques for determining classifications of detected anomalies in an enterprise cybersecurity AI platform according to this disclosure.
Figure 8:
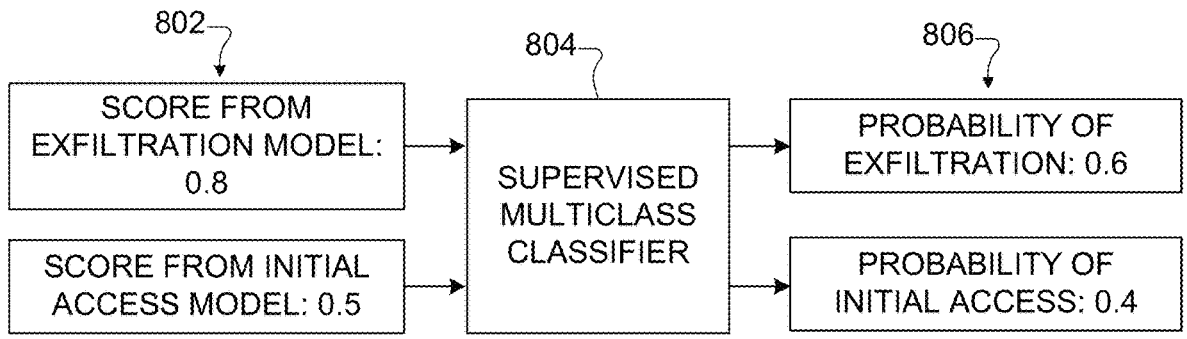

FIGS. 7 and 8 illustrate example techniques for determining classifications of detected anomalies in an enterprise cybersecurity AI platform according to this disclosure. These techniques may, for example, be used by the risk score calculation operation 604 to generate final risk scores for classifying anomalies. In the example of FIG. 7, two different machine learning models (such as two classifier operations 602) may be used to produce two initial classification outputs 702. These classification outputs 702 represent values produced by the two different machine learning models, where each value identifies the likelihood that an anomaly can be classified into one of two classifications associated with the two classifier operations 602. The risk score calculation operation 604 in FIG. 7 can perform a normalization of the two values, which in this example involves summing the two values to produce a sum and then dividing each value by the sum, to produce final risk scores 704. The final risk scores 704 represent probabilities of classification into the two classes associated with the two classifier operations 602. In this specific example, the model associated with the exfiltration anomaly category produces a value of 0.8, and the model associated with the initial access anomaly category produces a value of 0.5. The risk score calculation operation 604 can sum these values to produce a sum of 1.3, and the risk score calculation operation 604 can divide the value from each model to produce a probability. Thus, the probability of the anomaly falling into the exfiltration category is 0.8/1.3 (roughly 61.5%), and the probability of the anomaly falling into the initial access category is 0.5/1.3 (roughly 38.5%).

In the example of FIG. 8, two different machine learning models (such as two classifier operations 602) may be used to produce two initial classification outputs 802. Again, these classification outputs 802 represent values produced by the two different machine learning models, where each value identifies the likelihood that an anomaly can be classified into one of the two classifications associated with the two classifier operations 602. The risk score calculation operation 604 in FIG. 8 performs a supervised multiclass classifier operation 804, which can be trained (such as by using training data with appropriate labels) to use these input values as features. The supervised multiclass classifier operation 804 generates probabilistic outputs by weighting the values from the classifier operations 602 and producing probabilistic classification scores, which are final risk scores 806 representing probabilities of classification into the two classifications associated with the two classifier operations 602. In this specific example, the model associated with the exfiltration anomaly category produces a value of 0.8, and the model associated with the initial access anomaly category produces a value of 0.5. The risk score calculation operation 604 processes these values and produces a risk score 806 of 0.6 (60%) for the exfiltration category and a risk score 806 of 0.4 (40%) for the initial access category. Note that the supervised multiclass classifier operation 804 may represent any suitable machine learning model trained to process input values and generate risk scores, such as a neural network with a softmax output layer or a random forest classifier with multiple outputs.

As noted above, a wide variety of arrangements may be used when machine learning models are developed and deployed to perform anomaly classification. For example, system-level detections of security events (anomalies) may be performed using machine learning models that are associated with the system 100 and its subsystems in any suitable manner. In some embodiments, for instance, there may be one machine learning model (one classifier operation 602) per anomaly classification for each system or subsystem being monitored. Table 2 provides example details of how different machine learning models can be designed for different anomaly classifications, where different machine learning models are provided for each monitored system or subsystem.

TABLE 2

| Model ID | Classification | System/Subsystem ID | Input Features to Classifier Model |
|---|---|---|---|
| 1 | Exfiltration | 1 | Payload size, Destination IP/Port, etc. |
| 2 | Initial Access | 1 | Login country, Distance between current login location and previous login location, etc. |
| 3 | Exfiltration | 2 | Payload size, Destination IP/Port, etc. |
| 4 | Initial Access | 2 | Login country, Distance between current login location and previous login location, etc. |

In other embodiments, there may be one machine learning model (one classifier operation 602) per anomaly classification for all systems or subsystems being monitored. Table 3 provides example details of how different machine learning models can be designed for different anomaly classifications, where the same machine learning models are provided for all monitored systems or subsystems.

TABLE 3

| Model ID | Classification | System/Subsystem ID | Input Features to Classifier Model |
| --- | --- | --- | --- |
| 1 | Exfiltration | 1, 2 | Payload size, Destination IP/Port, etc. |
| 2 | Initial Access | 1, 2 | Login country, Distance between current login location and previous login location, etc. |

In still other embodiments, there may be one or more machine learning models (one or more classifier operations 602) per system or subsystem being monitored or for all systems or subsystems being monitored, where each machine learning model can be trained for multiple anomaly classifications. Table 4 provides example details of how one or more machine learning models can each be designed for different anomaly classifications, where different machine learning models are provided for different monitored systems or subsystems.

TABLE 4

| Model ID | Classification | System/Subsystem ID | Input Features to Classifier Model |
| --- | --- | --- | --- |
| 1 | Exfiltration | 1 | Payload size, Destination IP/Port, etc. |
|  | Initial Access | 1 | Login country, Distance between current login location and previous login location, etc. |
| 2 | Exfiltration | 2 | Payload size, Destination IP/Port, etc. |
|  | Initial Access | 2 | Login country, Distance between current login location and previous login location, etc. |

Note that these embodiments are for illustration only, and an AI platform may use any suitable number of machine learning models (classifier operations 602) to classify anomalies into different classifications.

Although FIG. 6 illustrates one example of a classification operation 600 used to classify detected anomalies in an enterprise cybersecurity AI platform and FIGS. 7 and 8 illustrate examples of techniques for determining classifications of detected anomalies in an enterprise cybersecurity AI platform, various changes may be made to FIGS. 6 through 8. For example, functions and components can be added, omitted, combined, further subdivided, replicated, or placed in any other suitable configuration in FIG. 6 according to particular needs. Also, any other suitable techniques may be used for classifying anomalies. In addition, the risk score calculation operation 604 may use any other suitable technique to determine final classification risk scores based on inputs from multiple classifiers.

One issue affecting an AI-based system is acceptance by human personnel who use or interact with the AI-based system. An aspect of acceptance that is often useful or important to human personnel is interpretability, which refers to the ability of the human personnel to understand why the AI-based system makes a specific decision or chooses whether to perform an action based on its input data. If human personnel can see an explanation why the AI-based system makes a specific decision or chooses to perform or not perform an action, the human personnel can determine whether the AI-based system is operating as expected or desired. This can also help to increase trust in the AI-based system.

For the AI platform described in this disclosure, one example mechanism for acceptance can include identifying the features being used by a detection model (such as a machine learning model used by the AI-based detection function 302) to identify anomalies and illustrating why those features justify detection of one or more anomalies. Thus, a detection model can be made interpretable by selecting one or more of the most important features of a prediction or other decision by the detection model (such as by using Shapley values) and illustrating those features on a graph or in another visual representation. In some cases, one or more appropriate baseline metrics can be visualized in the graph or other visual representation for comparison.

Figure 9:
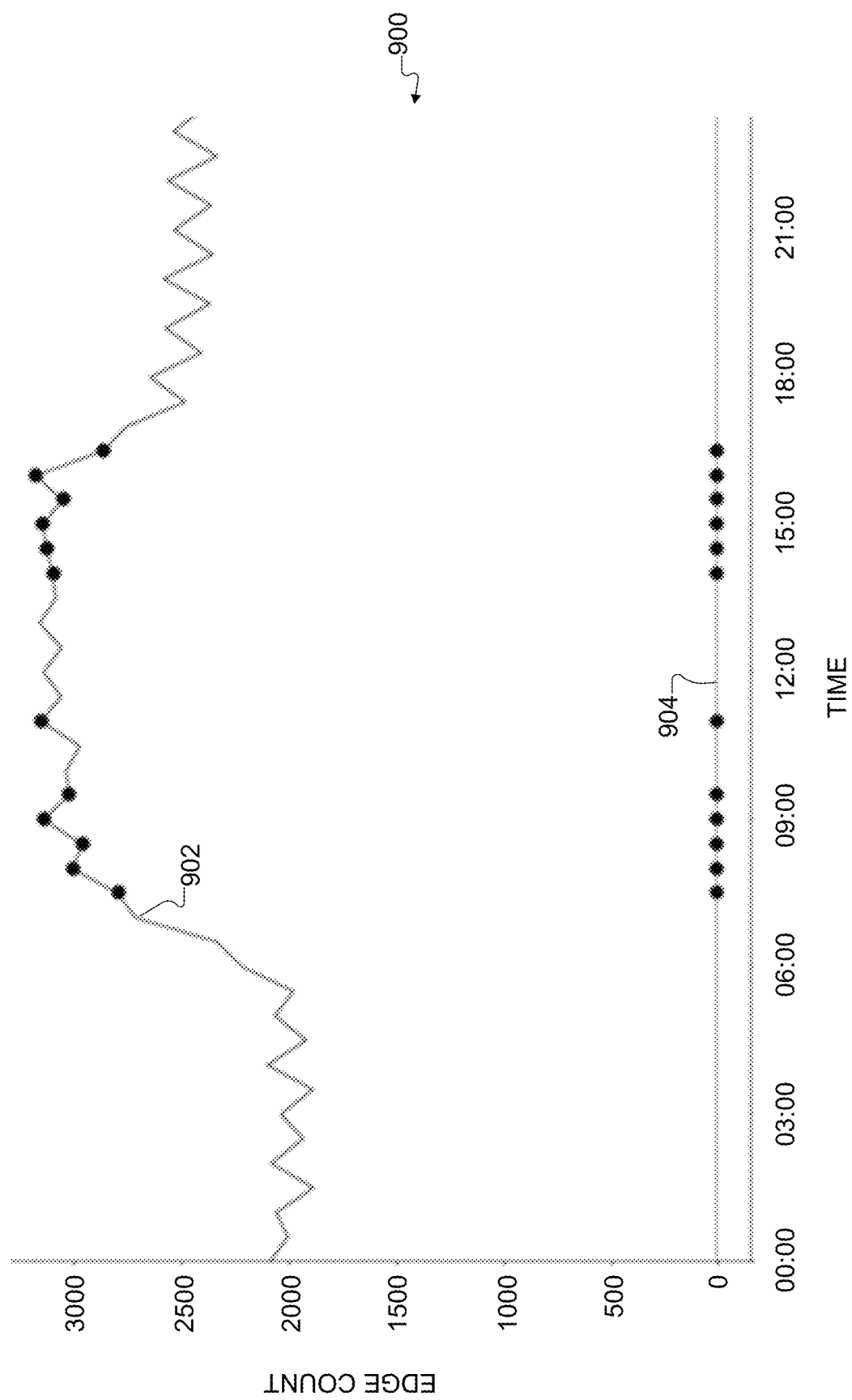
FIG. 9 illustrates an example graph plotting one or more time-series features used for anomaly detection in an enterprise cybersecurity AI platform according to this disclosure.

One example of this is shown in FIG. 9, which illustrates an example graph 900 plotting one or more time-series features used for anomaly detection in an enterprise cybersecurity AI platform according to this disclosure. In the example of FIG. 9, the graph 900 is associated with an anomaly related to a denial of service (DoS) attack. A line 902 in the graph 900 plots the number of inbound authentication events, and a line 904 in the graph 900 plots the number of outbound authentication events. When a denial of service attack occurs at a victim system, the number of inbound authentication events can be considered excessive (such as when it exceeds a threshold value), and that metric can be illustrated over time using the number of outbound authentication events as a baseline. By presenting this type of graph or other visual representation, illustration, or explanation, the identification of an anomaly associated with a DoS attack by the AI-based detection function 302 can be explained in terms that human personnel can easily understand.

Note that explanations can also be provided for decisions made by a classification model (such as a machine learning model used by the AI-based classification function 304) or other AI-based functions 306, 308 of the AI platform. For decisions made by a classification model, for instance, the AI platform may present a listing of the features used by the classification model and a value that each feature contributed to a classification decision. As a particular example, the listed features may represent the most important features associated with a classification decision as determined by the AI platform or a user.

Another interpretability aspect can relate to how classification risk scores or other AI-based scores are expressed. For example, cyberthreat risk scores may be determined as probabilities, which typically lie within a range of values from zero to one hundred. If an AI model generates most risk scores below a value of thirty, it might make sense to set a threshold for identifying high-risk anomalies at a value of twenty-five. However, humans may typically associate higher values with high-risk situations, such as when humans may consider a risk score of eighty or above as being high-risk. In these cases, risk scores generated by the AI platform can be scaled or calibrated appropriately so that the risk scores are more meaningful to human personnel. Example types of scaling or calibration techniques that may be used by the AI platform can include Platt scaling and isotonic regression, although any other suitable scaling or calibration techniques may be used.

Yet another interpretability aspect can relate to how localization results are presented to human personnel. For example, if a cyberthreat is detected based on one or more anomalies and the threat is localized (such as by the AI-based localization function 306), the localization results could be presented to one or more users in a graphical representation of the system being monitored. As a particular example, the AI-based localization function 306 may have access to a layout that graphically illustrates where different devices in the system 100 are located or how different devices in the system 100 interact, and the AI-based localization function 306 may use data vision to produce a modified version of the layout identifying where one or more attacking devices are located and/or where one or more attacked devices are located. One example of this is described below.

Although FIG. 9 illustrates one example of a graph 900 plotting one or more time-series features used for anomaly detection in an enterprise cybersecurity AI platform, various changes may be made to FIG. 9. For example, the contents of the graph 900 can easily vary based on the features being used for anomaly detection. Also, the example techniques for providing interpretability of decisions in the AI platform described above are for illustration and explanation only. In general, a wide variety of interfaces, charts, graphs, lists, or other mechanisms can be used to explain the decisions of the AI platform. While the above interpretability examples are provided to illustrate some example ways in which interpretability of decisions can be supported, any other or additional techniques may be used.

Once an anomaly is classified into an actual anomaly classification and identified as an actual cyberthreat (such as when its risk score for the final selected classification is above a threshold), any suitable action or actions may occur in response to the detected anomaly. In some cases, for example, one or more alerts can be generated and transmitted to one or more humans, such as one or more security analysts or SOC personnel. The alerts may have any suitable form, such as pop-up messages or other notifications presented on one or more display screens, text messages presented on one or more mobile devices, or email messages sent to one or more destinations. The alerts may also have any suitable contents, such as an identification of the classification of an anomaly, its risk score, and its location within a monitored system (if known or available).

The AI-based response function 308 may also allow one or more automated responses to occur in response to an anomaly that has been classified as an actual cyberthreat. The action or actions taken in response to a detected anomaly can vary based on a number of factors, such as the specific classification of the anomaly, the specific risk score associated with the anomaly, and whether the action(s) can be taken with or without human intervention or approval. For instance, an anomaly in a certain classification and having a risk score slightly above a threshold may be associated with one or more lower-priority actions, while an anomaly in the same classification and having a risk score greatly above the threshold may be associated with one or more higher-priority actions.

In some embodiments, the AI-based response function 308 selects actions to be performed in response to detected anomalies based on (i) the classifications of those anomalies and (ii) the risk scores of those anomalies. For example, these characteristics can be used to select one or more profile actions for each classified anomaly, and the one or more selected actions may be executed with or without human input. In some cases, the one or more selected actions for each classified anomaly may be executed in parallel with the alert(s) sent for that anomaly. This approach allows the AI-based response function 308 to take appropriate actions depending on the identified type of cyberthreat. In particular embodiments, the profile actions can be predefined, such as during initial system configuration, by identifying the profile actions along with parameters spanning risk scores, anomaly classifications, medium access control (MAC) addresses, and so on. In other words, profile actions can be predefined for different types of anomaly classifications, different ranges of anomaly risk scores, and different devices within a monitored system. The profile actions may include any suitable actions to be performed, such as closing application programming interface (API) endpoints, identifying and containing any affected device(s), and eradicating malware. If the AI-based response function 308 encounters an anomaly associated with a new or unrecognized type of cyberthreat, a predefined action may include running a clustering or similarity scoring algorithm to identify the closest known anomaly classification that matches the new or unrecognized anomaly, and the predefined action(s) for the closest known anomaly classification may be performed as a first attempt at containing the new or unrecognized cyberthreat. Further monitoring and data collection can then help to model the new or unrecognized cyberthreat shortly after discovery.

The AI-based response function 308 may also or alternatively use one or more trained machine learning models to identify appropriate actions to be performed in response to classified anomalies. For example, the one or more trained machine learning models can be trained to identify suitable actions to be performed when responding to, containing, and eradicating cyberthreats. By learning different threat features, mechanisms, and appropriate actions to handle them, the one or more trained machine learning models can be used to effectively respond to known cyberthreats by identifying suitable actions for those cyberthreats. Moreover, the one or more trained machine learning models can be used to effectively respond to new or unrecognized cyberthreats, such as by breaking down a cyberthreat's components and outputting appropriate responses. The one or more trained machine learning models can also consider historical human actions taken in response to cyberthreats, such as traditional information technology (IT) or SOC actions taken within an enterprise, when determining how to respond to classified anomalies. Any suitable machine learning model structure may be used here, such as a DNN or a random forest network that can learn multilabel outputs. Thus, for each classified anomaly, a trained machine learning model can use features such as attack characteristics (like spyware, data exfiltration, or phishing characteristics) and generate one or more labels identifying one or more appropriate actions to counter the threat based on the features. Labels could include things such as identification operations, isolation operations, and removal operations. Again, any identified action(s) may or may not require human interaction or approval prior to execution. In some cases, human approval of an action may be needed (at least for some threats), and a human user may approve or reject the action via his or her mobile device or other device (such as the device on which a corresponding alert is displayed). The risk score for a classified anomaly may be included in any request for approval or rejection in order to enable the human user to see the priority of the request.

Figure 10:
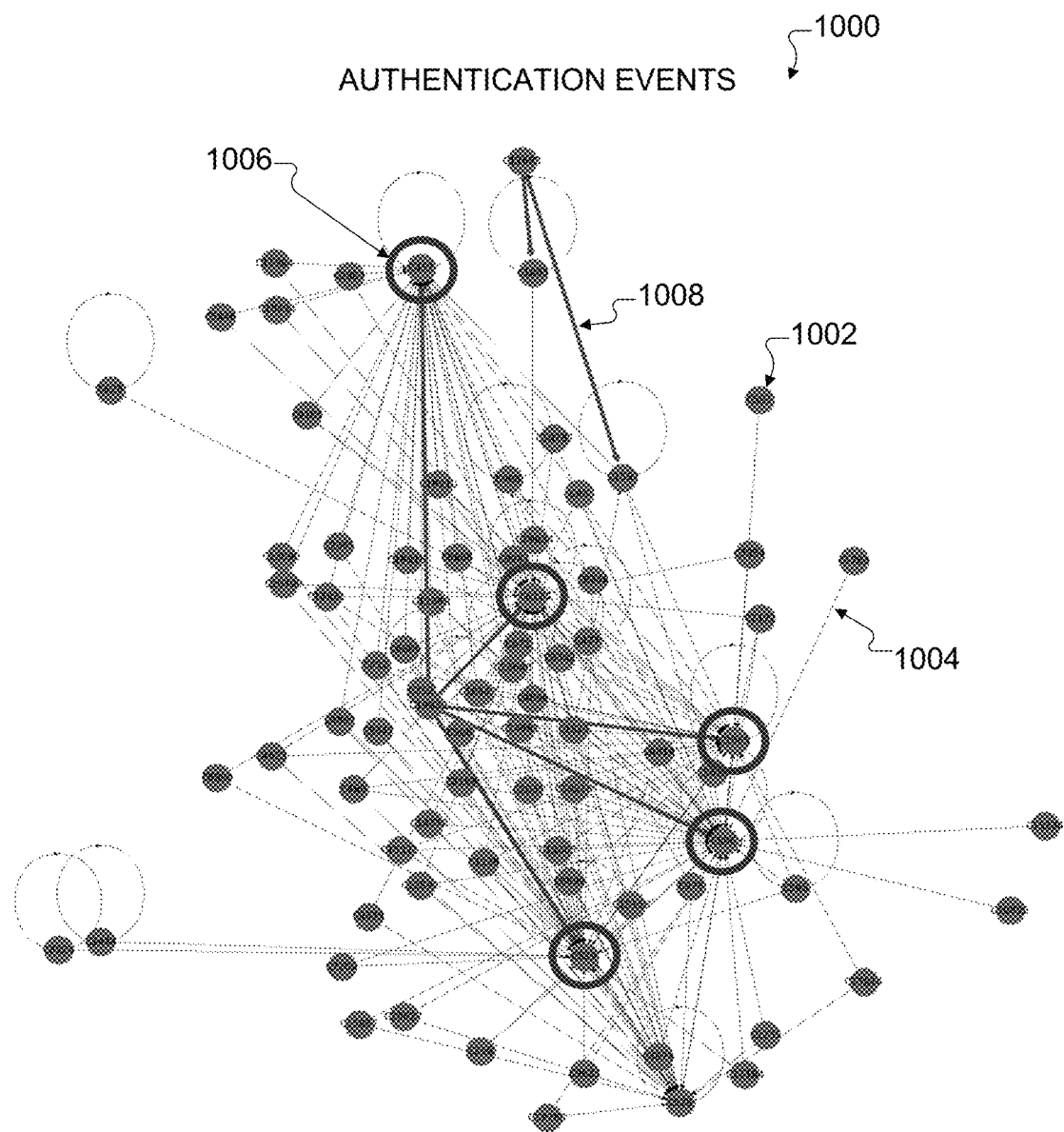
FIG. 10 illustrates an example representation of a system topology for use in anomaly detection and response in an enterprise cybersecurity AI platform according to this disclosure.

In some cases, AI-based anomaly detection and/or AI-based response can be performed using graph-based operations. That is, a graph can be constructed based on the topology of a monitored system. As a particular example, a directed graph can be generated based on the topology of the monitored system, where edges within the directed graph indicate flows of network traffic and/or authentication events between components within the monitored system. One example of this is shown in FIG. 10, which illustrates an example representation 1000 of a system topology for use in anomaly detection and response in an enterprise cybersecurity AI platform according to this disclosure. As shown in FIG. 10, the representation 1000 takes the form a directed graph in which nodes 1002 can represent devices or subsystems within a monitored system and edges 1004 indicate flows of authentication events.

In some embodiments, statistics may be generated for various edges 1004 and used to identify anomalies involving the nodes 1002. For example, edge statistics can be used to identify attackers or incidents, such as when attacker or incident nodes 1002 do not have self-directed edges 1004 but regular nodes 1002 do. Edge statistics can also be used to identify victims, such as when victim nodes 1002 have a larger number of incoming edges 1004 relative to outgoing edges 1004 in comparison to non-victim nodes 1002. Edge statistics can therefore be used as input features for a supervised or unsupervised anomaly detection algorithm. The same or other types of edge statistics may also be input to a supervised or unsupervised classification algorithm for use in classifying anomalies. This may further help to facilitate localization of attacker or incident and victim nodes 1002 and an identification of actions to be taken to isolate certain nodes 1002.

In the example shown in FIG. 10, for instance, circles or other indicators 1006 can be used to identify nodes 1002 that may be associated with identified anomalies. In this particular example, the circled nodes 1002 in FIG. 10 may represent nodes with an excessive number of incoming or outgoing connections, which may indicate that these nodes 1002 are victim or attacker/incident nodes. Also, line thickness, color, or other indicators 1008 can be used to identify edges 1004 that may be associated with identified anomalies, such as edges 1004 associated with specific types of network traffic or edges 1004 associated with communications involving specific IP addresses or ports. Once any problematic nodes 1002 or edges 1004 are identified, the AI-based response function 308 may take any suitable action(s), such as actions to reduce or minimize the effects of the anomalies. As a specific example, the AI-based response function 308 may block network traffic to and from one or more nodes 1002 suspected of engaging in data exfiltration.

Note that a representation of a monitored system, such as the representation 1000 or other representation, may be presented to one or more users, such as to provide a visual indication of identified anomalies and possible actions to be taken in response. The representation can also be updated over time (and possibly moved forward or backward in time depending on the available data) to show how anomalies have occurred or evolved over time and in space within a monitored system. The ability to see how anomalies occur or change over time may be useful, for example, during alert "triaging" in which attempts are made to combat cyberthreats identified by the anomalies. In some cases, for instance, the AI-based response function 308 may include one or more machine learning models trained to perform alert triaging case optimization in which execution orders or other parameters associated with responses to cyberthreats can be adjusted based on the specific cyberthreats being combatted. This type of functionality can be used, along with graphic representations of monitored systems, to help empower SOCs and other entities to combat cyberthreats. As another example, the AI platform can optimize the alerts that are sent to users (such as security analysts) based on the risk scores calculated for those alerts, which may allow for higher-priority alerts to be identified and handled faster than lower-priority alerts. As yet another example, case reporting typically refers to a function where detailed reports about cyber-incidents are generated and retained, such as for further analysis. The AI platform here can simplify the function of case reporting by generating reports having various fields that are pre-populated automatically (such as source system, incident time, investigator, etc.) rather than manually entered. Essentially, this approach can be thought of as a specific type of workflow management for cybersecurity systems, where the actions to be taken to combat cyberthreats can vary based on the specific cyberthreats detected.

Although FIG. 10 illustrates one example of a representation 1000 of a system topology for use in anomaly detection and response in an enterprise cybersecurity AI platform, various changes may be made to FIG. 10. For example, the contents of the representation 1000 can easily vary based on the specific topology of a monitored system and the specific interactions of components within the monitored system. Also, any other suitable representations may be used to represent anomalies within a monitored system.

Figure 11:
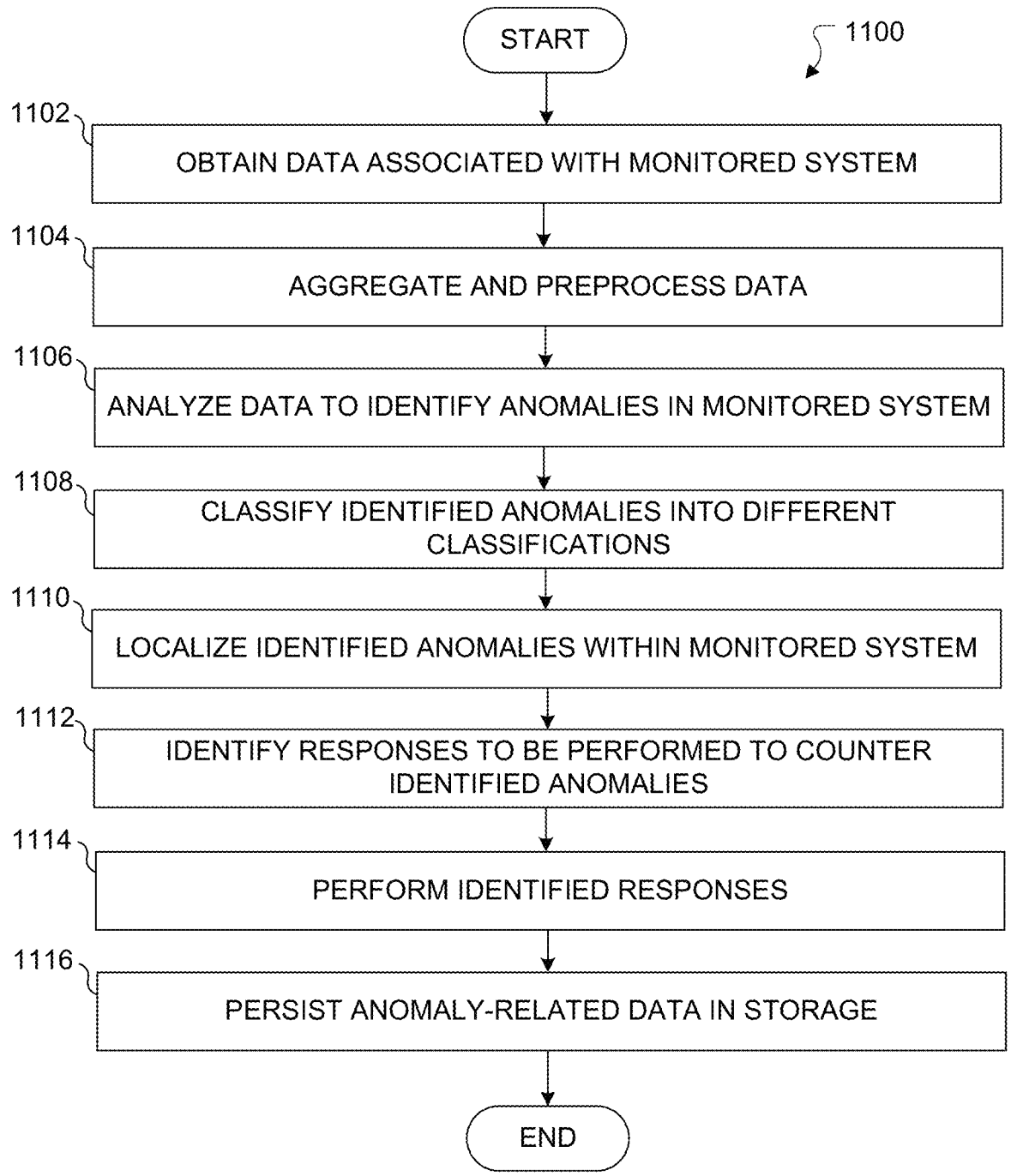
FIG. 11 illustrates an example method for providing enterprise cybersecurity using an AI platform according to this disclosure.

FIG. 11 illustrates an example method 1100 for providing enterprise cybersecurity using an AI platform according to this disclosure. For ease of explanation, the method 1100 shown in FIG. 11 is described as being performed using the application server 106 in the system 100 shown in FIG. 1, where the application server 106 may be implemented using one or more instances of the device 200 shown in FIG. 2. In particular, the method 1100 may relate to the operations of the high-level architecture 300 of the enterprise cybersecurity AI platform described above. However, the method 1100 could be performed using any other suitable device(s) and in any other suitable system(s) (such as the server 120).

As shown in FIG. 11, data associated with at least one monitored system is obtained at step 1102. This may include, for example, the processing device 202 of the application server 106 obtaining historical and near-real-time/real-time data associated with operation of the system 100. The data can include system and event logs, NetFlow data or other captured network traffic, user behavioral patterns, shared insights, and/or any other suitable cyber-related information. The data may be obtained from any suitable source(s) and can often be obtained from multiple sources. The data is aggregated and preprocessed at step 1104. This may include, for example, the processing device 202 of the application server 106 parsing the obtained data to identify selected information within the obtained data to be used for further processing.

The data is analyzed to identify anomalies in the at least one monitored system at step 1106. This may include, for example, the processing device 202 of the application server 106 performing the AI-based detection function 302 in order to identify anomalies indicative of potential cyberthreats within the system 100. As a particular example, this may include the processing device 202 of the application server 106 providing the selected information as input features to one or more detection models (one or more machine learning models), where the detection model(s) can be trained to detect anomalies indicative of potential cyberthreats within the system 100. In some embodiments, multiple detection models using different AI techniques (such as supervised and unsupervised learning) may be used to detect anomalies indicative of potential cyberthreats within the system 100.

The identified anomalies are classified into different classifications or categories at step 1108 and localized within the at least one monitored system at step 1110. This may include, for example, the processing device 202 of the application server 106 performing the AI-based classification function 304 in order to classify the detected anomalies into different predefined categories. As a particular example, this may include the processing device 202 of the application server 106 providing information associated with the detected anomalies as input features to one or more classification models (one or more machine learning models), where the classification model(s) can be trained to classify detected anomalies into different categories. This may also include the processing device 202 of the application server 106 performing the AI-based localization function 306 in order to localize the detected anomalies within the system 100. As a particular example, this may include the processing device 202 of the application server 106 providing information associated with the detected anomalies as input features to one or more localization models (one or more machine learning models), where the localization model(s) can be trained to localize detected anomalies within the system 100.

One or more responses to be performed in order to counter at least some of the anomalies are identified at step 1112 and performed at step 1114. This may include, for example, the processing device 202 of the application server 106 performing the AI-based response function 308 in order to identify possible actions to be performed in response to the detected anomalies. In some cases, the responses can vary based on the classifications and localizations of the detected anomalies, as well as risk scores and other information associated with the detected anomalies. As a particular example, this may include the processing device 202 of the application server 106 providing information associated with the detected anomalies as input features to one or more response models (one or more machine learning models), where the response model(s) can be trained to identify responses to be performed based on classified anomalies. Note that human approval may or may not be needed in order to perform one, some, or all of the identified actions.

Anomaly-related data can be persisted in a data storage at step 1116. This may include, for example, the processing device 202 of the application server 106 storing information related to detected anomalies, such as aggregated and normalized features of the detected anomalies, in the database 110. Raw data associated with all events may be persisted for a relatively short time period (such as one or several months), while raw data associated with the detected anomalies may be stored for a longer period. Also, relevant derived data (such as aggregated and normalized features) of detected anomalies may be persisted for even longer periods, possibly for the entire monitoring history of a monitored system. This can help to reduce the amount of data stored long-term and/or enable relevant anomaly-related data to be stored for longer periods of time.

Although FIG. 11 illustrates one example of a method 1100 for providing enterprise cybersecurity using an AI platform, various changes may be made to FIG. 11. For example, while shown as a series of steps, various steps in FIG. 11 may overlap, occur in parallel, occur in a different order, or occur any number of times.

Figure 12:
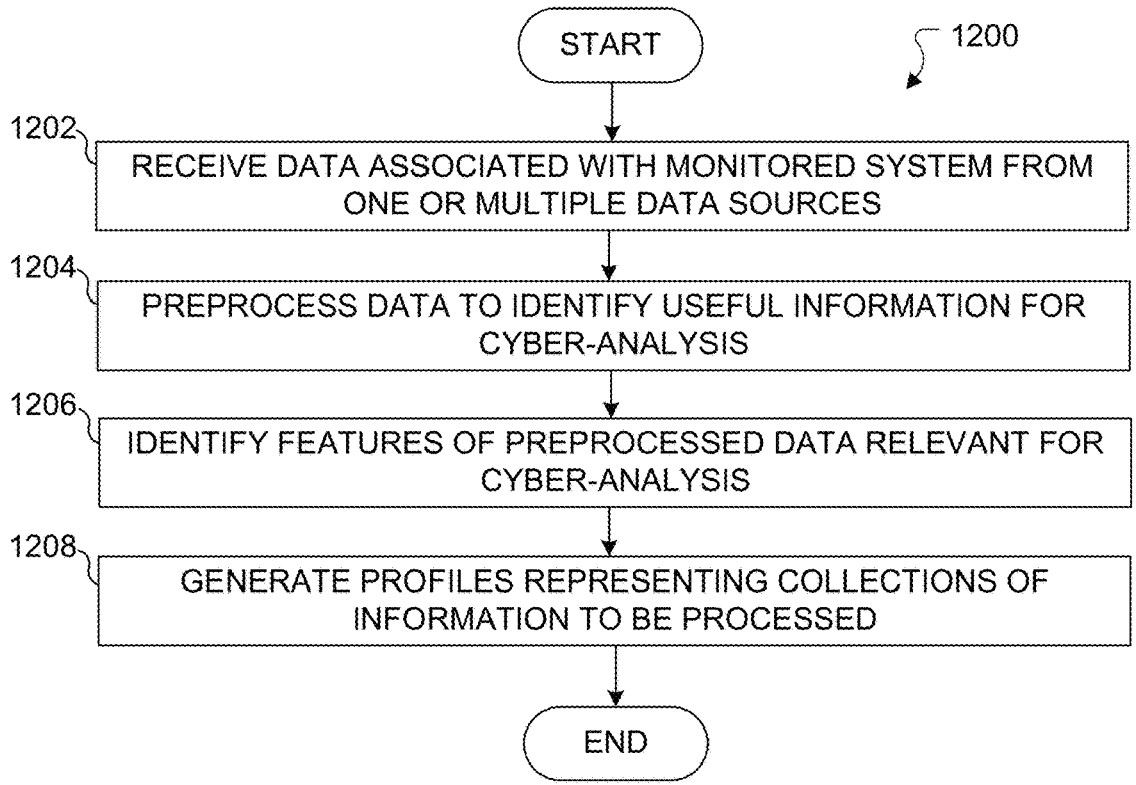
FIG. 12 illustrates an example method for data collection as part of providing enterprise cybersecurity using an AI platform according to this disclosure.

FIG. 12 illustrates an example method 1200 for data collection as part of providing enterprise cybersecurity using an AI platform according to this disclosure. For ease of explanation, the method 1200 shown in FIG. 12 is described as being performed using the application server 106 in the system 100 shown in FIG. 1, where the application server 106 may be implemented using one or more instances of the device 200 shown in FIG. 2. In particular, the method 1200 may relate to the operations of the dynamic data processing and aggregation operation 400 described above. However, the method 1200 could be performed using any other suitable device(s) and in any other suitable system(s) (such as the server 120).

As shown in FIG. 12, data associated with at least one monitored system is received from one or more data sources at step 1202. This may include, for example, the processing device 202 of the application server 106 obtaining historical and near-real-time/real-time data associated with operation of the system 100. Various examples of the types of data that may be received here are provided above. The data may be obtained from the database 110, one or more devices within the system 100, and/or one or more sources outside the system 100. The data is preprocessed to identify information that is useful for subsequent cybersecurity analysis at step 1204. This may include, for example, the processing device 202 of the application server 106 parsing system and event logs using natural language processing or other processing to identify relevant events. This may also include the processing device 202 of the application server 106 parsing NetFlow data or other captured network traffic to identify relevant statistics about network traffic to and from devices within the system 100.

Features relevant for subsequent cybersecurity analysis are identified using the preprocessed data at step 1206. This may include, for example, the processing device 202 of the application server 106 extracting specific types of information from the preprocessed data and/or calculating specific types of information based on the preprocessed data. Examples of identified features may include a network's average number of users, an average number of user inbound connections, an average number of user outbound connections, critical words that may be used in risky system and event logs, an average payload size of data transmitted by each user over a network, typical destination IP addresses and ports for data transmitted by each user over a network, login locations of users, and distances between login locations of users. In some embodiments, graph-based anomaly detection/localization/response are used in the AI platform, and the processing device 202 of the application server 106 may identify features based on statistics associated with nodes 1002 and/or edges 1004 within a graphical representation of the monitored system.

Profiles representing collections of information to be processed during subsequent cybersecurity analysis are generated at step 1208. This may include, for example, the processing device 202 of the application server 106 generating profiles containing preprocessed data and identified features determined based on that preprocessed data. The generated profiles may be provided for analysis in order to identify whether actual anomalies indicative of cyberthreats are present within the generated profiles.

Although FIG. 12 illustrates one example of a method 1200 for data collection as part of providing enterprise cybersecurity using an AI platform, various changes may be made to FIG. 12. For example, while shown as a series of steps, various steps in FIG. 12 may overlap, occur in parallel, occur in a different order, or occur any number of times.

Figure 13:
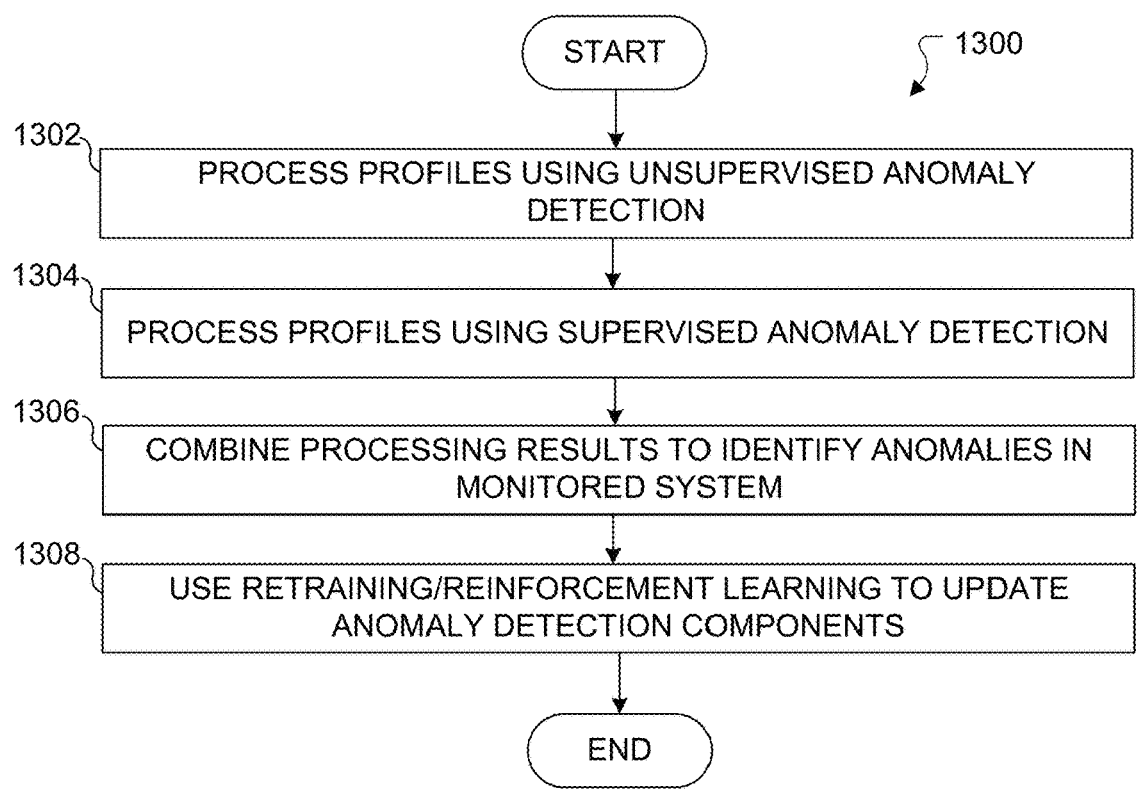
FIG. 13 illustrates an example method for AI-based anomaly detection as part of providing enterprise cybersecurity using an AI platform according to this disclosure.

FIG. 13 illustrates an example method 1300 for AI-based anomaly detection as part of providing enterprise cybersecurity using an AI platform according to this disclosure. For ease of explanation, the method 1300 shown in FIG. 13 is described as being performed using the application server 106 in the system 100 shown in FIG. 1, where the application server 106 may be implemented using one or more instances of the device 200 shown in FIG. 2. In particular, the method 1300 may relate to the operations of the multi-AI anomaly detection operation 500 described above. However, the method 1300 could be performed using any other suitable device(s) and in any other suitable system(s) (such as the server 120).

As shown in FIG. 13, generated profiles of information are processed using unsupervised anomaly detection at step 1302 and supervised anomaly detection at step 1304. This may include, for example, the processing device 202 of the application server 106 analyzing the generated profiles using different machine learning models that support unsupervised and supervised learning techniques. As described above, the unsupervised learning typically includes using one or more machine learning models to analyze and cluster unlabeled data in order to identify possible associations within the data, which allows for detection of anomalies within the generated profiles. Also, the supervised learning typically includes using one or more machine learning models that have been trained to process data in order to identify labels for specific types of anomalies that are detected, which also allows for detection of anomalies within the generated profiles. Note that any suitable combination of unsupervised learning techniques and/or supervised learning techniques may be used here for anomaly detection The results generated by the unsupervised and supervised anomaly detection processing operations can be combined or otherwise used to identify anomalies in at least one monitoring system at step 1306. This may include, for example, the processing device 202 of the application server 106 determining whether both unsupervised and supervised learning techniques identified the same anomalies, which can be an indication of a high level of likelihood that actual anomalies have occurred. This may also include the processing device 202 of the application server 106 weighting different anomaly detection results differently, such as by weighting supervised anomaly detection decisions differently (higher or lower) compared to unsupervised anomaly detection decisions. One possible goal here can be to reduce the number of "false positive" anomaly detections.

Retraining and/or reinforcement learning may optionally be used to update the unsupervised and supervised anomaly detection components at step 1308. This may include, for example, the processing device 202 of the application server 106 using additional training data (such as feedback from human personnel related to prior anomaly detection results) to update the machine learning models used for unsupervised and supervised anomaly detection. This step can occur at any suitable time(s), such as periodically, irregularly, on demand, or in any other suitable manner.

Although FIG. 13 illustrates one example of a method 1300 for AI-based anomaly detection as part of providing enterprise cybersecurity using an AI platform, various changes may be made to FIG. 13. For example, while shown as a series of steps, various steps in FIG. 13 may overlap, occur in parallel, occur in a different order, or occur any number of times.

Figure 14:
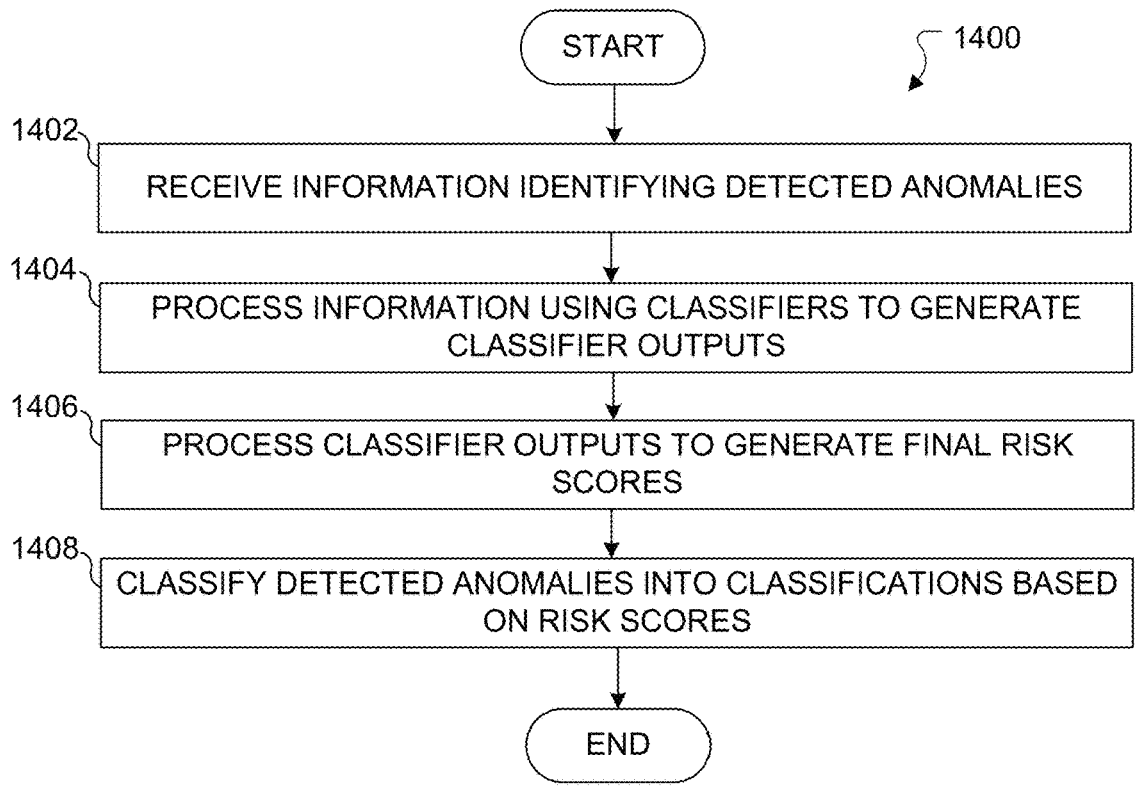
FIG. 14 illustrates an example method for AI-based anomaly classification as part of providing enterprise cybersecurity using an AI platform according to this disclosure.

FIG. 14 illustrates an example method 1400 for AI-based anomaly classification as part of providing enterprise cybersecurity using an AI platform according to this disclosure. For ease of explanation, the method 1400 shown in FIG. 14 is described as being performed using the application server 106 in the system 100 shown in FIG. 1, where the application server 106 may be implemented using one or more instances of the device 200 shown in FIG. 2. In particular, the method 1400 may relate to the operations of the classification operation 600 described above. However, the method 1400 could be performed using any other suitable device(s) and in any other suitable system(s) (such as the server 120).

As shown in FIG. 14, information identifying or otherwise associated with detected anomalies is received at step 1402. This may include, for example, the processing device 202 of the application server 106 obtaining identified features, preprocessed data, profiles, or other information for each anomaly that has been detected as described above. This information is processed using different classifiers to generate different classifier outputs at step 1404. This may include, for example, the processing device 202 of the application server 106 generating different numerical values for each anomaly, where the different numerical values identify the likelihoods of that anomaly being classified into different classifications or categories. These numerical values may be generated using one or more machine learning models, and any suitable number of machine learning models may be used for the classifications within each monitored system or across different monitored systems.

The classifier outputs are processed to generate final risk scores at step 1406. This may include, for example, the processing device 202 of the application server 106 combining the different numerical values for each anomaly using normalization, machine learning, or other technique to produce final risk scores for each anomaly. Each final risk score can identify the final calculated probability of the associated anomaly being classified into one of the different classifications or categories. Each detected anomaly is classified into one of the different classifications or categories based on its risk scores at step 1408. This may include, for example, the processing device 202 of the application server 106 classifying each detected anomaly into the classification or category associated with the highest risk score calculated for that anomaly.

Although FIG. 14 illustrates one example of a method 1400 for AI-based anomaly classification as part of providing enterprise cybersecurity using an AI platform, various changes may be made to FIG. 14. For example, while shown as a series of steps, various steps in FIG. 14 may overlap, occur in parallel, occur in a different order, or occur any number of times.

Figure 15:
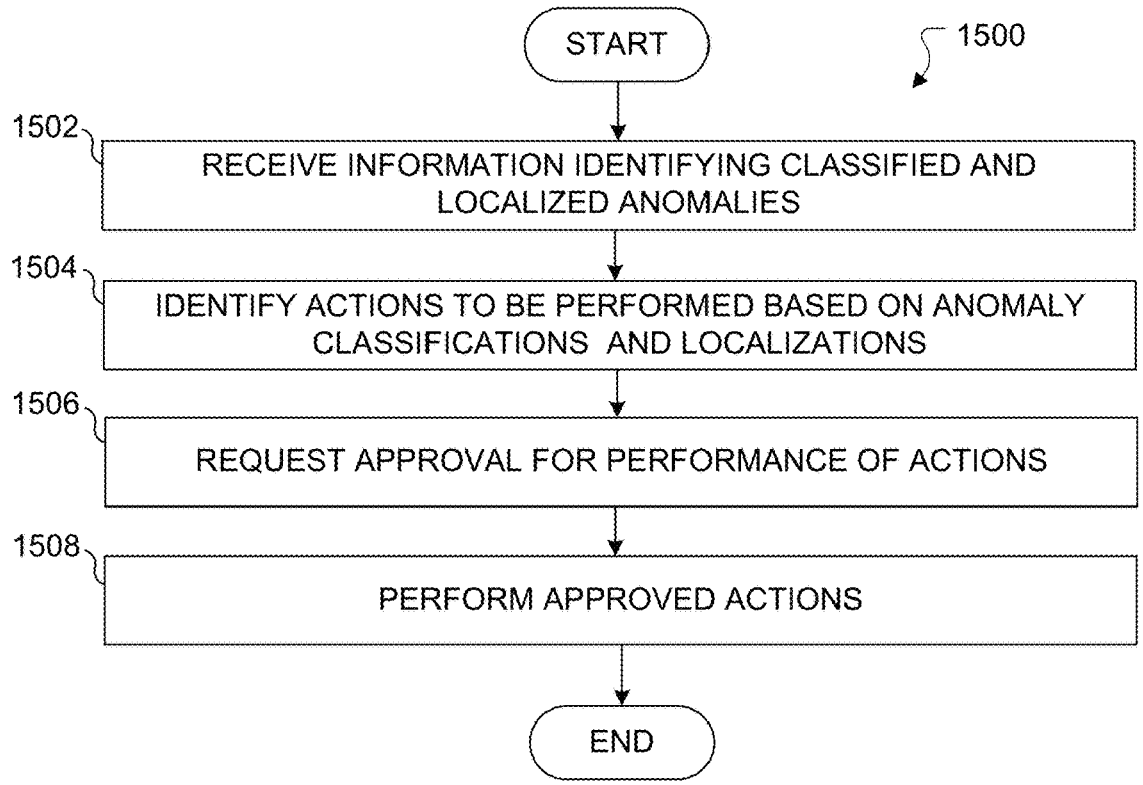
FIG. 15 illustrates an example method for AI-based anomaly response as part of providing enterprise cybersecurity using an AI platform according to this disclosure.

FIG. 15 illustrates an example method 1500 for AI-based anomaly response as part of providing enterprise cybersecurity using an AI platform according to this disclosure. For ease of explanation, the method 1500 shown in FIG. 15 is described as being performed using the application server 106 in the system 100 shown in FIG. 1, where the application server 106 may be implemented using one or more instances of the device 200 shown in FIG. 2. In particular, the method 1500 may relate to the operations of the AI-based response function 308 described above. However, the method 1500 could be performed using any other suitable device(s) and in any other suitable system(s) (such as the server 120).

As shown in FIG. 15, information identifying or otherwise associated with classified and (optionally) localized anomalies is received at step 1502. This may include, for example, the processing device 202 of the application server 106 obtaining identified classifications, locations, or other information for detected anomalies generated as described above. This information is used to identify one or more actions that can be performed to counter each of the classified anomalies at step 1504. This may include, for example, the processing device 202 of the application server 106 using the classification of each anomaly, optionally along with its localization and/or other information (such as the risk score of that anomaly's classified category), to identify at least one action to be performed. Any suitable technique may be used here to identify the action(s) for each classified anomaly, such as by using predefined actions based on rules, machine learning, or other techniques.

Approval may be requested for performance of the identified action(s) for each classified anomaly at step 1506. This may include, for example, the processing device 202 of the application server 106 requesting user approval for performing one or more actions, such as by requesting approval within an alert, notification, or other message. Each request may include any suitable information, such as the identified anomaly, its risk score, and any recommended action(s). The approved action or actions can be performed at step 1508. This may include, for example, the processing device 202 of the application server 106 taking one or more actions to minimize the impact of a cyberthreat, such as blocking network traffic or isolating devices within the system 100. Note, however, that one, some, or all of the identified actions for each anomaly or for specific type(s) of anomalies may be performed automatically without human intervention in other embodiments.

Although FIG. 15 illustrates one example of a method 1500 for AI-based anomaly response as part of providing enterprise cybersecurity using an AI platform, various changes may be made to FIG. 15. For example, while shown as a series of steps, various steps in FIG. 15 may overlap, occur in parallel, occur in a different order, or occur any number of times.

The following describes example embodiments of this disclosure that implement an enterprise cybersecurity AI platform. However, other embodiments may be used in accordance with the teachings of this disclosure.

In a first embodiment, a method includes obtaining data associated with operation of a monitored system. The monitored system includes electronic devices and one or more networks, and the obtained data is associated with events involving the electronic devices and the one or more networks. The method also includes using one or more first machine learning models to identify anomalies in the monitored system based on the obtained data. Each anomaly identifies an anomalous behavior of at least one of the electronic devices or at least one of the one or more networks. The method further includes using one or more second machine learning models to classify each of at least some of the identified anomalies into one of multiple classifications. Different ones of the classifications are associated with different types of cyberthreats to the monitored system. The identified anomalies are classified based on risk scores determined using the one or more second machine learning models. In addition, the method includes identifying, for each of at least some of the anomalies, one or more actions to be performed in order to counteract the cyberthreat associated with the anomaly.

In a second embodiment, an apparatus includes at least one processing device configured to obtain data associated with operation of a monitored system. The monitored system includes electronic devices and one or more networks, and the obtained data is associated with events involving the electronic devices and the one or more networks. The at least one processing device is also configured to use one or more first machine learning models to identify anomalies in the monitored system based on the obtained data. Each anomaly identifies an anomalous behavior of at least one of the electronic devices or at least one of the one or more networks. The at least one processing device is further configured to use one or more second machine learning models to classify each of at least some of the identified anomalies into one of multiple classifications based on risk scores determined using the one or more second machine learning models. Different ones of the classifications are associated with different types of cyberthreats to the monitored system. In addition, the at least one processing device is also configured to identify, for each of at least some of the anomalies, one or more actions to be performed in order to counteract the cyberthreat associated with the anomaly.

In a third embodiment, a non-transitory computer readable medium storing computer readable program code that when executed causes one or more processors to obtain data associated with operation of a monitored system. The monitored system includes electronic devices and one or more networks, and the obtained data is associated with events involving the electronic devices and the one or more networks. The medium also stores computer readable program code that when executed causes the one or more processors to use one or more first machine learning models to identify anomalies in the monitored system based on the obtained data. Each anomaly identifies an anomalous behavior of at least one of the electronic devices or at least one of the one or more networks. The medium further stores computer readable program code that when executed causes the one or more processors to use one or more second machine learning models to classify each of at least some of the identified anomalies into one of multiple classifications based on risk scores determined using the one or more second machine learning models. Different ones of the classifications are associated with different types of cyberthreats to the monitored system. In addition, the medium stores computer readable program code that when executed causes the one or more processors to identify, for each of at least some of the anomalies, one or more actions to be performed in order to counteract the cyberthreat associated with the anomaly.

Any single one or any suitable combination of the following features may be used with the first, second, or third embodiment.

The data associated with the operation of the monitored system may be obtained from multiple data sources, relevant data within the obtained data can be identified, input features can be identified using the relevant data, and profiles can be generated each containing a portion of the relevant data and one or more of the input features that are associated with the portion of the relevant data. The data may include logs and network traffic, and the data sources may include one or more data sources within the monitored system and one or more data sources outside the monitored system.

The one or more first machine learning models may include (i) at least one unsupervised anomaly detection model configured to detect anomalies using unsupervised learning by analyzing and clustering the obtained data in order to identify associations within the obtained data and (ii) at least one supervised anomaly detection model configured to detect anomalies using supervised learning by processing the obtained data in order to identify labels for specific types of anomalies detected within the obtained data. Detection outputs from the unsupervised and supervised anomaly detection models may be used to identify the anomalies in the monitored system.

The one or more second machine learning models may include multiple classification models configured to generate multiple values for each of at least some of the anomalies, and each value may identify a likelihood that an associated one of the anomalies is classifiable into one of the multiple classifications. The multiple values may be used to generate the risk scores, and each risk score may identify a final probability that the associated one of the anomalies is classifiable into one of the multiple classifications.

The risk scores may be generated using one of normalization and machine learning based on values from at least one of the first and second machine learning models.

The one or more second machine learning models may include one of: (i) a machine learning model for each classification and for each monitored system, (ii) a machine learning model for each classification and for multiple monitored systems, (iii) a machine learning model for multiple classifications and for each monitored system, or (iv) a machine learning model for multiple classifications and for multiple monitored systems.

Shared insights across multiple monitored systems associated with different enterprises may be obtained, and the shared insights may be used to identify importances of features to be used when identifying the anomalies associated with the different types of cyberthreats. Multiple groups associated with different monitored systems may be identified, and the shared insights may be stored in association with the groups such that the importances of features for one group are available for use in additional monitored systems associated with that group. The importances of features for each group may allow cyberthreats identified at one or more monitored systems associated with one group to be detected at other monitored systems associated with the same group.

Information can be presented to explain one or more decisions made by the one or more first machine learning models or the one or more second machine learning models.

For each of at least some of the anomalies, at least one of a location of an attacker or incident associated with the anomaly and a location of a victim associated with the anomaly may be identified. The one or more actions to be performed in order to counteract the cyberthreat associated with one of the anomalies may be based on at least one of the location of the attacker or incident associated with the anomaly and the location of the victim associated with the anomaly.

The one or more actions to be performed for each of at least some of the anomalies may be identified by one of: (i) for an anomaly associated with a known cyberthreat, identifying one or more predefined actions to be performed based on the classification and at least one of the risk scores associated with the anomaly; and (ii) for an anomaly associated with a new or unknown cyberthreat, using a clustering or similarity scoring algorithm to identify a closest known cyberthreat to the new or unknown cyberthreat and identifying one or more predefined actions to be performed associated with the closest known cyberthreat.

At least one third machine learning model may be used to identify, for each of at least some of the anomalies, the one or more actions to be performed. The at least one third machine learning model may be trained to identify labels. The labels may identify actions to be performed in response to the anomalies.

At least one of graph-based anomaly detection, graph-based anomaly classification, and graph-based response identification may be performed based on a directed graph. The directed graph may represent components of the monitored system as nodes and represent network traffic or events involving the components of the monitored system as directed edges.

Information associated with one or more of the anomalies may be persisted. The persisted information for each of the one or more anomalies may include an identified profile and identified features associated with the anomaly.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining data associated with operation of a monitored system, the monitored system comprising electronic devices and one or more networks, the obtained data associated with events involving the electronic devices and the one or more networks;
using one or more first machine learning models to identify anomalies in the monitored system based on the obtained data, each anomaly identifying an anomalous behavior of at least one of the electronic devices or at least one of the one or more networks;
using multiple second machine learning models to classify each of at least some of the identified anomalies into one of multiple classifications, different ones of the classifications associated with different types of cyberthreats to the monitored system, the multiple second machine learning models comprising multiple classification models configured to generate multiple values for each of at least some of the anomalies, each classification model trained differently from the other classification models in order to recognize a single different classification of anomalies among the multiple classifications, each classification model configured to generate a value identifying a likelihood that an associated one of the anomalies is classifiable into the single different classification associated with that classification model, the identified anomalies classified based on risk scores determined by using machine learning to combine the multiple values from the multiple classification models;
performing graph-based response identification based on a directed graph that represents components of the monitored system as nodes and that represents network traffic or events involving the components of the monitored system as directed edges; and
identifying, for each of at least some of the anomalies, one or more actions to be performed in order to counteract the cyberthreat associated with the anomaly;
wherein performing the graph-based response identification comprises, for at least one node of the directed graph:
generating edge statistics of one or more directed edges going into the at least one node of the directed graph;
generating edge statistics of one or more directed edges going out of the at least one node of the directed graph; and
providing the edge statistics to the multiple second machine learning models to identify actions to be taken to isolate the at least one node of the directed graph.

2. The method of claim 1, wherein obtaining the data associated with the operation of the monitored system comprises:
obtaining the data from multiple data sources, the data comprising logs and network traffic, the data sources comprising one or more data sources within the monitored system and one or more data sources outside the monitored system;
identifying relevant data within the obtained data;
identifying input features using the relevant data; and
generating profiles each containing a portion of the relevant data and one or more of the input features that are associated with the portion of the relevant data.

3. The method of claim 1, wherein:
the one or more first machine learning models comprise:
at least one unsupervised anomaly detection model configured to detect anomalies using unsupervised learning, the unsupervised learning analyzing and clustering the obtained data in order to identify associations within the obtained data; and
at least one supervised anomaly detection model configured to detect anomalies using supervised learning, the supervised learning processing the obtained data in order to identify labels for specific types of anomalies detected within the obtained data; and
detection outputs from the unsupervised and supervised anomaly detection models are used to identify the anomalies in the monitored system.

4. The method of claim 1, wherein each risk score identifies a final probability that the associated one of the anomalies is classifiable into one of the multiple classifications.

5. The method of claim 1, wherein the risk scores are generated using supervised machine learning to combine the multiple values from the multiple classification models.

6. The method of claim 1, wherein the multiple second machine learning models comprise one of:
a machine learning model for each classification and for each monitored system; and
a machine learning model for each classification and for multiple monitored systems.

7. The method of claim 1, further comprising:
obtaining shared insights across multiple monitored systems associated with different enterprises; and
using the shared insights to identify importances of features to be used when identifying the anomalies associated with the different types of cyberthreats.

8. The method of claim 7, further comprising:
identifying multiple groups associated with different monitored systems; and
storing the shared insights in association with the groups such that the importances of features for one group are available for use in additional monitored systems associated with that group.

9. The method of claim 8, wherein the importances of features for each group allow cyberthreats identified at one or more monitored systems associated with one group to be detected at other monitored systems associated with the same group.

10. The method of claim 1, further comprising:
presenting information to explain one or more decisions made by the one or more first machine learning models or the multiple second machine learning models.

11. The method of claim 1, further comprising:
identifying, for each of at least some of the anomalies, at least one of a location of an attacker or incident associated with the anomaly and a location of a victim associated with the anomaly;
wherein the one or more actions to be performed in order to counteract the cyberthreat associated with one of the anomalies is based on at least one of the location of the attacker or incident associated with the anomaly and the location of the victim associated with the anomaly.

12. The method of claim 1, wherein identifying, for each of at least some of the anomalies, the one or more actions to be performed comprises one of:
for an anomaly associated with a known cyberthreat, identifying one or more predefined actions to be performed based on the classification and at least one of the risk scores associated with the anomaly; and
for an anomaly associated with a new or unknown cyberthreat, using a clustering or similarity scoring algorithm to identify a closest known cyberthreat to the new or unknown cyberthreat and identifying one or more predefined actions to be performed associated with the closest known cyberthreat.

13. The method of claim 1, wherein:
identifying, for each of at least some of the anomalies, the one or more actions to be performed comprises using at least one third machine learning model; and
the at least one third machine learning model is trained to identify labels, the labels identifying actions to be performed in response to the anomalies.

14. The method of claim 1, further comprising:
performing graph-based anomaly classification based on the directed graph.

15. The method of claim 14, wherein performing the graph-based anomaly classification comprises, for at least one node of the directed graph:
generating edge statistics of one or more directed edges going into the at least one node of the directed graph;
generating edge statistics of one or more directed edges going out of the at least one node of the directed graph; and
providing the edge statistics to the multiple second machine learning models to classify each of at least some of the identified anomalies.

16. The method of claim 1, further comprising:
persisting information associated with the events, the persisted information comprising:
raw data associated with the events persisted for a first period of time;
raw data associated with the identified anomalies persisted for a second period of time longer than the first period of time; and
at least some of derived data associated with the identified anomalies persisted for a third period of time longer than the second period of time.

17. An apparatus comprising:
at least one processing device configured to:
obtain data associated with operation of a monitored system, the monitored system comprising electronic devices and one or more networks, the obtained data associated with events involving the electronic devices and the one or more networks;
use one or more first machine learning models to identify anomalies in the monitored system based on the obtained data, each anomaly identifying an anomalous behavior of at least one of the electronic devices or at least one of the one or more networks;
use multiple second machine learning models to classify each of at least some of the identified anomalies into one of multiple classifications, the multiple second machine learning models comprising multiple classification models configured to generate multiple values for each of at least some of the anomalies, each classification model trained differently from the other classification models in order to recognize a single different classification of anomalies among the multiple classifications, each classification model configured to generate a value identifying a likelihood that an associated one of the anomalies is classifiable into the single different classification associated with that classification model, the identified anomalies classified based on risk scores determined by using machine learning to combine the multiple values from the multiple classification models, different ones of the classifications associated with different types of cyberthreats to the monitored system;
perform graph-based response identification based on a directed graph that represents components of the monitored system as nodes and that represents network traffic or events involving the components of the monitored system as directed edges; and
identify, for each of at least some of the anomalies, one or more actions to be performed in order to counteract the cyberthreat associated with the anomaly;
wherein, to perform the graph-based response identification, the at least one processing device is configured, for at least one node of the directed graph, to:
generate edge statistics of one or more directed edges going into the at least one node of the directed graph;
generate edge statistics of one or more directed edges going out of the at least one node of the directed graph; and
provide the edge statistics to the multiple second machine learning models to identify actions to be taken to isolate the at least one node of the directed graph.

18. The apparatus of claim 17, wherein, to obtain the data associated with the operation of the monitored system, the at least one processing device is configured to:
obtain the data from multiple data sources, the data comprising logs and network traffic, the data sources comprising one or more data sources within the monitored system and one or more data sources outside the monitored system;
identify relevant data within the obtained data;
identify input features using the relevant data; and
generate profiles each containing a portion of the relevant data and one or more of the input features that are associated with the portion of the relevant data.

19. The apparatus of claim 17, wherein:
the one or more first machine learning models comprise:
at least one unsupervised anomaly detection model configured to detect anomalies using unsupervised learning by analyzing and clustering the obtained data in order to identify associations within the obtained data; and
at least one supervised anomaly detection model configured to detect anomalies using supervised learning by processing the obtained data in order to identify labels for specific types of anomalies detected within the obtained data; and
the at least one processing device is configured to use detection outputs from the unsupervised and supervised anomaly detection models to identify the anomalies in the monitored system.

20. The apparatus of claim 17, wherein each risk score identifies a final probability that the associated one of the anomalies is classifiable into one of the multiple classifications.

21. The apparatus of claim 17, wherein the at least one processing device is further configured to:
obtain shared insights across multiple monitored systems associated with different enterprises; and
use the shared insights to identify importances of features to be used when identifying the anomalies associated with the different types of cyberthreats.

22. The apparatus of claim 17, wherein:
the at least one processing device is further configured to identify, for each of at least some of the anomalies, at least one of a location of an attacker or incident associated with the anomaly and a location of a victim associated with the anomaly; and the at least one processing device is configured to identify the one or more actions to be performed in order to counteract the cyberthreat associated with one of the anomalies based on at least one of the location of the attacker or incident associated with the anomaly and the location of the victim associated with the anomaly.

23. The apparatus of claim 17, wherein, to identify the one or more actions to be performed for each of at least some of the anomalies, the at least one processing device is configured to one of:

for an anomaly associated with a known cyberthreat, identify one or more predefined actions to be performed based on the classification and at least one of the risk scores associated with the anomaly; and for an anomaly associated with a new or unknown cyberthreat, use a clustering or similarity scoring algorithm to identify a closest known cyberthreat to the new or unknown cyberthreat and identify one or more predefined actions to be performed associated with the closest known cyberthreat.

24. The apparatus of claim 17, wherein:

the at least one processing device is configured to use at least one third machine learning model to identify, for each of at least some of the anomalies, the one or more actions to be performed; and the at least one third machine learning model is trained to identify labels, the labels identifying actions to be performed in response to the anomalies.

25. The apparatus of claim 17, wherein the at least one processing device is further configured to perform graph-based anomaly classification based on the directed graph.

26. The apparatus of claim 25, wherein, to perform the graph-based anomaly classification, the at least one processing device is configured, for at least one node of the directed graph, to:

generate edge statistics of one or more directed edges going into the at least one node of the directed graph;

generate edge statistics of one or more directed edges going out of the at least one node of the directed graph; and provide the edge statistics to the multiple second machine learning models to classify each of at least some of the identified anomalies.

27. A non-transitory computer readable medium storing computer readable program code that when executed causes one or more processors to:

obtain data associated with operation of a monitored system, the monitored system comprising electronic devices and one or more networks, the obtained data associated with events involving the electronic devices and the one or more networks;

use one or more first machine learning models to identify anomalies in the monitored system based on the obtained data, each anomaly identifying an anomalous behavior of at least one of the electronic devices or at least one of the one or more networks;

use multiple second machine learning models to classify each of at least some of the identified anomalies into one of multiple classifications, the multiple second machine learning models comprising multiple classification models configured to generate multiple values for each of at least some of the anomalies, each classification model trained differently from the other classification models in order to recognize a single different classification of anomalies among the multiple classifications, each classification model configured to generate a value identifying a likelihood that an associated one of the anomalies is classifiable into the single different classification associated with that classification model, the identified anomalies classified based on risk scores determined by using machine learning to combine the multiple values from the multiple classification models, different ones of the classifications associated with different types of cyberthreats to the monitored system;

perform graph-based response identification based on a directed graph that represents components of the monitored system as nodes and that represents network traffic or events involving the components of the monitored system as directed edges; and identify, for each of at least some of the anomalies, one or more actions to be performed in order to counteract the cyberthreat associated with the anomaly;

wherein the computer readable program code that when executed causes the one or more processors to perform the graph-based response identification comprises computer readable program code that when executed causes the one or more processors, for at least one node of the directed graph, to:

generate edge statistics of one or more directed edges going into the at least one node of the directed graph;

generate edge statistics of one or more directed edges going out of the at least one node of the directed graph; and provide the edge statistics to the multiple second machine learning models to identify actions to be taken to isolate the at least one node of the directed graph.

28. The non-transitory computer readable medium of claim 27, wherein the computer readable program code that when executed causes the one or more processors to obtained the data associated with the operation of the monitored system comprises:

computer readable program code that when executed causes the one or more processors to:

obtain the data from multiple data sources, the data comprising logs and network traffic, the data sources comprising one or more data sources within the monitored system and one or more data sources outside the monitored system;

identify specified data within the obtained data;

identify input features using the specified data; and generate profiles each containing a portion of the specified data and one or more of the input features that are associated with the portion of the specified data.

29. The non-transitory computer readable medium of claim 27, wherein:

the one or more first machine learning models comprise:

at least one unsupervised anomaly detection model configured to detect anomalies using unsupervised learning by analyzing and clustering the obtained data in order to identify associations within the obtained data; and at least one supervised anomaly detection model configured to detect anomalies using supervised learning by processing the obtained data in order to identify labels for specific types of anomalies detected within the obtained data; and the computer readable program code that when executed causes the one or more processors to identify the anomalies in the monitored system comprises:

computer readable program code that when executed causes the one or more processors to use detection outputs from the unsupervised and supervised anomaly detection models to identify the anomalies in the monitored system.

30. The non-transitory computer readable medium of claim 27, wherein each risk score identifies a final probability that the associated one of the anomalies is classifiable into one of the multiple classifications.

31. The non-transitory computer readable medium of claim 27, further storing computer readable program code that when executed causes the one or more processors to:
obtain shared insights across multiple monitored systems associated with different enterprises; and
use the shared insights to identify importances of features to be used when identifying the anomalies associated with the different types of cyberthreats.

32. The non-transitory computer readable medium of claim 27, wherein:
the medium further stores computer readable program code that when executed causes the one or more processors to identify, for each of at least some of the anomalies, at least one of a location of an attacker or incident associated with the anomaly and a location of a victim associated with the anomaly; and
the computer readable program code that when executed causes the one or more processors to identify the one or more actions to be performed comprises:
computer readable program code that when executed causes the one or more processors to identify the one or more actions to be performed in order to counteract the cyberthreat associated with one of the anomalies based on at least one of the location of the attacker or incident associated with the anomaly and the location of the victim associated with the anomaly.

33. The non-transitory computer readable medium of claim 27, wherein the computer readable program code that when executed causes the one or more processors to identify the one or more actions to be performed for each of at least some of the anomalies comprises:
computer readable program code that when executed causes the one or more processors to one of:
for an anomaly associated with a known cyberthreat, identify one or more predefined actions to be performed based on the classification and at least one of the risk scores associated with the anomaly; and
for an anomaly associated with a new or unknown cyberthreat, use a clustering or similarity scoring algorithm to identify a closest known cyberthreat to the new or unknown cyberthreat and identify one or more predefined actions to be performed associated with the closest known cyberthreat.

34. The non-transitory computer readable medium of claim 27, wherein:
the computer readable program code that when executed causes the one or more processors to identify the one or more actions to be performed for each of at least some of the anomalies comprises:
computer readable program code that when executed causes the one or more processors to use at least one third machine learning model; and
the at least one third machine learning model is trained to identify labels, the labels identifying actions to be performed in response to the anomalies.

35. The non-transitory computer readable medium of claim 27, wherein the computer readable program code when executed causes the one or more processors to perform graph-based anomaly classification based on the directed graph.

36. The non-transitory computer readable medium of claim 35, wherein the computer readable program code that when executed causes the one or more processors to perform the graph-based anomaly classification comprises computer readable program code that when executed causes the one or more processors, for at least one node of the directed graph, to:
generate edge statistics of one or more directed edges going into the at least one node of the directed graph;
generate edge statistics of one or more directed edges going out of the at least one node of the directed graph; and
provide the edge statistics to the multiple second machine learning models to classify each of at least some of the identified anomalies.

* * * * *